US011484766B2

(12) United States Patent
Kubota et al.

(10) Patent No.: US 11,484,766 B2
(45) Date of Patent: Nov. 1, 2022

(54) DISPLAY METHOD, INFORMATION PROCESSING DEVICE, AND COMPUTER-READABLE RECORDING MEDIUM

(71) Applicant: FUJITSU LIMITED, Kawasaki (JP)

(72) Inventors: Kazumi Kubota, Kawasaki (JP); Hirohisa Naito, Fuchu (JP)

(73) Assignee: FUJITSU LIMITED, Kawasaki (JP)

( * ) Notice: Subject to any disclaimer, the term of this patent is extended or adjusted under 35 U.S.C. 154(b) by 444 days.

(21) Appl. No.: 16/585,422

(22) Filed: Sep. 27, 2019

(65) Prior Publication Data
US 2020/0164261 A1 May 28, 2020

(30) Foreign Application Priority Data

Nov. 28, 2018 (JP) .............................. JP2018-222339

(51) Int. Cl.
*A63B 71/06* (2006.01)
*A63B 24/00* (2006.01)
(Continued)

(52) U.S. Cl.
CPC ...... *A63B 71/0622* (2013.01); *A63B 24/0006* (2013.01); *A63B 24/0062* (2013.01);
(Continued)

(58) Field of Classification Search
CPC ............ A63B 71/0622; A63B 24/0006; A63B 24/0062; G06K 9/00342; G07C 1/22; G07C 1/28
(Continued)

(56) References Cited

U.S. PATENT DOCUMENTS

2014/0067096 A1* 3/2014 Aibara .................. A63B 71/06
700/91
2018/0140927 A1* 5/2018 Kito ........................ G06F 1/163
2019/0220658 A1 7/2019 Kawashima et al.

FOREIGN PATENT DOCUMENTS

JP   2014-045782 A   3/2014
JP   2015-033476 A   2/2015
(Continued)

OTHER PUBLICATIONS

Extended European Search Report dated Feb. 17, 2020, issued in corresponding European Patent Application No. 19200002.4.
(Continued)

*Primary Examiner* — Ayodeji O Ayotunde
(74) *Attorney, Agent, or Firm* — Xsensus LLP

(57) ABSTRACT

A display method executed by a processor includes: acquiring an identification result relating to any one of a plurality of elements included in a series of exercise and a position of an athlete that performs the elements based on 3D sensing data that is acquired by sensing the series of exercise by the athlete of a sport scored by a judge and an element dictionary data in which characteristics of an element and a position of the sport scored by a judge are defined; identifying any one of an element and a position that is being displayed in a 3D model video based on the 3D sensing data corresponding to the series of exercise, based on the identification result; and identifying, for the any one of the element and the position being displayed, time information corresponding to a boundary with any one of a next element and a next position.

15 Claims, 22 Drawing Sheets

(51) Int. Cl.
  *G07C 1/22* (2006.01)
  *G07C 1/28* (2006.01)
  *G06V 40/20* (2022.01)

(52) U.S. Cl.
  CPC .............. *G06V 40/23* (2022.01); *G07C 1/22* (2013.01); *G07C 1/28* (2013.01); *A63B 2024/0071* (2013.01); *A63B 2071/0636* (2013.01); *A63B 2071/0647* (2013.01)

(58) Field of Classification Search
  USPC .......................................................... 382/103
  See application file for complete search history.

(56) References Cited

FOREIGN PATENT DOCUMENTS

| JP | 2015-167676 A | 9/2015 |
|---|---|---|
| WO | 2018/069985 A1 | 4/2018 |

OTHER PUBLICATIONS

Anonymous: "Changing the World of Sports from Japan's Gymnastics—Scoring Support System Using 3D Sensing Technology [The power to Create the Future vol. 3 (Part I)]", Fujitsu Journal, Mar. 24, 2017 (Mar. 24, 2017), XP55622675, Retrieved from the Internet: URL:https://journal.jp.fujitsu.com/en/2017/03/24/01/ [retrieved on Sep. 16, 2019], 11 pp.

Haruki Shimamoto et al: "A Study of an Automated Scoring System for the Twist Skill in Horizontal Bar of Artistic Gymnastics", ECTI Transactions on Computer and Information Technology (ECTI-CIT), vol. 7, No. 1, May 1, 2013 (May 1, 2013), pp. 1-6, XP55622389, ISSN: 2286-9131.

Jeongeun Shin et al: "A study on motion analysis of an artistic gymnastics by using dynamic image processing—for a development of automatic scoring system of horizontal bar—", 2008 IEEE International Conference on Systems, Man and Cybernetics : SMC Singapore, Oct. 12-15, 2008, May 15, 2008 (May 5, 2008), pp. 1037-1042, XP55617277, Piscataway, NJ, US DOI: 10. 1109/ICSMC. 2008. 4811418 ISBN:978-1-4244-2383-5.

\* cited by examiner

FIG.7

| EXERCISE ID | FRAME NUMBER | SENSING FRAME |
|---|---|---|
| P101 | 1 | SENSING FRAME CORRESPONDING TO EXERCISE ID "P101", FRAME NUMBER "1" |
| | 2 | SENSING FRAME CORRESPONDING TO EXERCISE ID "P101", FRAME NUMBER "2" |
| | 3 | SENSING FRAME CORRESPONDING TO EXERCISE ID "P101", FRAME NUMBER "3" |
| | ... | ... |
| ... | | |

| EXERCISE ID | FRAME NUMBER | X0 | Y0 | Z0 | ... | X17 | Y17 | Z17 |
|---|---|---|---|---|---|---|---|---|
| P101 | 1 | 100 | 20 | 0 | | 200 | 40 | 5 |
| P101 | 2 | 101 | 25 | 5 | | 202 | 39 | 15 |
| P101 | 3 | 110 | 32 | 7 | | 210 | 45 | 12 |
| ... | ... | | | | | | | |
| P101 | 100 | 201 | 125 | 30 | | 225 | 150 | 10 |

FIG. 10

| EXERCISE ID | FRAME NUMBER | SKELETON DATA | 3D MODEL DATA |
|---|---|---|---|
| P101 | 1 | SKELETON DATA OF EXERCISE ID "P101", FRAME NUMBER "1" | 3D MODEL DATA OF OF EXERCISE ID "P101", FRAME NUMBER "1" |
| | 2 | SKELETON DATA OF EXERCISE ID "P101", FRAME NUMBER "2" | 3D MODEL DATA OF OF EXERCISE ID "P101", FRAME NUMBER "2" |
| | 3 | SKELETON DATA OF EXERCISE ID "P101", FRAME NUMBER "3" | 3D MODEL DATA OF OF EXERCISE ID "P101", FRAME NUMBER "3" |
| ... | ... | ... | ... |

| EVENT | ELEMENT NUMBER | ELEMENT NAME | REQUIREMENT |
|---|---|---|---|
| RINGS | G3-40 | TSUKAHARA "LI NING (LI NING 2) TO CROSS (L-CROSS) HANG (2 SECONDS)" | REQUIREMENT OF "TSUKAHARA" |
| | ... | | |
| | G3-46 | MOLINARI "KIP V-CROSS (2 SECONDS)" | REQUIREMENT OF "MOLINARI" |
| | ... | | |
| | G3-48 | RODRIGUES "FRONT UPRISE INVERTED SHALLOW" | REQUIREMENT OF "RODRIGUES" |
| | G3-52 | KATO "BACK UPRISE V-CROSS (2 SECONDS)" | REQUIREMENT OF "KATO" |
| | G3-53 | BACK UPRISE MALTESE | REQUIREMENT OF "BACK UPRISE MALTESE" |
| | | ... | |

| EVENT | EXER-CISE ID | ELEMENT NUMBER | FIRST START TIME | FIRST END TIME | FLAG | SECOND START TIME | SECOND END TIME | ELEMENT NAME |
|---|---|---|---|---|---|---|---|---|
| RINGS | 001 | G3-53 | 00:24.82 | 00:29.35 | ON | 00:26.35 | 00:28.80 | BACK UPRISE MALTESE (2 SECONDS) |
| | | G2-52 | 00:30.07 | 00:34.85 | ON | 00:31.85 | 00:34.55 | AZARIAN: SLOW LAYOUT KIP TO CROSS (L-CROSS) WITH STRAIGHT ARMS (2 SECONDS) |
| | | G1-87 | 00:40.89 | 00:45.42 | ON | 00:42.42 | 00:44.62 | ·FRONT GIANT HANDSTAND (2 SECONDS)<br>·BACK UPRISE HANDSTAND (2 SECONDS) |
| | | G1-51 | 00:45.96 | 00:47.28 | OFF | | | YAMAWAKI "FRONT TUCKED DOUBLE SOMERSAULT HANG" |
| | | G1-52 | 00:47.28 | 00:48.67 | OFF | | | JONATHAN "FRONT PIKE (LAYOUT) DOUBLE SOMERSAULT HANG" |
| | | G3-16 | 00:48.67 | 00:53.10 | ON | 00:50.10 | 00:53.00 | FRONT SOMERSAULT DIRECT CROSS AT RING HEIGHT (L-CROSS) HANG (2 SECONDS) |
| | | G1-49 | 00:53.28 | 00:58.75 | OFF | | | SLOW SHIFT TO SHOULDER POSITION FROM HANG |
| | | G3-69 | 00:58.75 | 01:02.57 | ON | 00:59.57 | 01:02.30 | BACK UPRISE STRADDLE SHALLOW (2 SECONDS) |
| | | G1-81 | 01:02.75 | 01:06.46 | ON | 01:03.46 | 01:05.75 | ·BACK GIANT HANDSTAND (2 SECONDS)<br>·FELGE HANDSTAND (2 SECONDS) |
| | | G1-26 | 01:10.50 | 01:11.28 | OFF | | | FELGE HANDSTAND PROGRESSION WITH STRAIGHT ARMS |
| | | G4-41 | 01:12.00 | 01:13.78 | OFF | | | BACK TUCKED DOUBLE SOMERSAULT TO TWO TWIST LANDING |

FIG.16

| EXERCISE ID | FRAME NUMBER | VIDEO FRAME |
|---|---|---|
| P101 | 1 | VIDEO FRAME OF EXERCISE ID "P101", FRAME NUMBER "1" |
| | 2 | VIDEO FRAME OF EXERCISE ID "P101", FRAME NUMBER "2" |
| | 3 | VIDEO FRAME OF EXERCISE ID "P101", FRAME NUMBER "3" |
| | ... | ... |
| ... | | |

| ICON IDENTIFICATION NUMBER | ICON IMAGE | EVALUATION INDEX | DEFINITION |
|---|---|---|---|
| B1 | ICON IMAGE OF ICON IDENTIFICATION NUMBER "E1" | ANKLE ANGLE | ANGLE BETWEEN FIRST LINE SEGMENT AND SECOND LINE SEGMENT |
| B2 | ICON IMAGE OF ICON IDENTIFICATION NUMBER "E2" | KNEE ANGLE | ANGLE BETWEEN THIRD LINE SEGMENT AND FOURTH LINE SEGMENT |
| B3 | ICON IMAGE OF ICON IDENTIFICATION NUMBER "E3" | WAIST ANGLE | ANGLE BETWEEN FIFTH LINE SEGMENT AND SIXTH LINE SEGMENT |
| B4 | ICON IMAGE OF ICON IDENTIFICATION NUMBER "E4" | SHOULDER ANGLE | ANGLE BETWEEN SEVENTH LINE SEGMENT AND EIGHTH LINE SEGMENT |
| B5 | ICON IMAGE OF ICON IDENTIFICATION NUMBER "E5" | ELBOW ANGLE | ANGLE BETWEEN NINTH LINE SEGMENT AND TENTH SEGMENT |
| ... | | | |
| B8 | ICON IMAGE OF ICON IDENTIFICATION NUMBER "E8" | ANGLES OF ARBITRARILY SELECTED TWO POINTS RELATIVE TO ARBITRARILY SELECTED RIGHT REFERENCE PLANE | ANGLES OF ARBITRARILY SELECTED TWO POINTS RELATIVE TO ARBITRARILY SELECTED RIGHT REFERENCE PLANE |
| B9 | ICON IMAGE OF ICON IDENTIFICATION NUMBER "E9" | ANGLES OF ARBITRARILY SELECTED TWO POINTS RELATIVE TO ARBITRARILY SELECTED HORIZONTAL REFERENCE PLANE | ANGLES OF ARBITRARILY SELECTED TWO POINTS RELATIVE TO ARBITRARILY SELECTED HORIZONTAL REFERENCE PLANE |
| ... | | | |

DISPLAY METHOD, INFORMATION PROCESSING DEVICE, AND COMPUTER-READABLE RECORDING MEDIUM

CROSS-REFERENCE TO RELATED APPLICATION

This application is based upon and claims the benefit of priority of the prior Japanese Patent Application No. 2018-222339, filed on Nov. 28, 2018, the entire contents of which are incorporated herein by reference.

FIELD

The embodiment discussed herein is related to a display method, and the like.

BACKGROUND

In competitive gymnastics, men compete in six events including the floor exercises, the pommel horse, the rings, the vault horse, the parallel bars, and the horizontal bar, and women compete in four events including the vault, the uneven parallel bars, the balance beam, and the floor. In the events except the vault, plural techniques (e.g., elements) are performed successively to compose a single performance (e.g., exercise) for both men and women.

An exercise score is calculated by totaling a D (difficulty) score and an E (execution) score. For example, the D score is a score calculated based on whether an element is performed successfully or not. The E-score is a score calculated by the deduction method according the perfection of an element. Whether an element is performed successfully and the perfection of an element are judged by visual inspection of judges based on a rule book in which the code of points is provided.

For the D score, inquiries of the score is allowed, if the inquiries are made immediately after the publication of the score or, at the very latest, before the score of the following gymnast or group is displayed. Only the accredited coaches in the competition area are entitled to make an inquiry. All inquiries need to be examined by the Superior Jury. A recorded video of the gymnast is reviewed, and whether the score is appropriate is deliberated (for example, Japanese Laid-open Patent Publication Nos. 2014-45782, 2015-167676, and 2015-33476).

SUMMARY

According to an aspect of the embodiments, a display method executed by a processor includes: acquiring an identification result relating to any one of a plurality of elements included in a series of exercise and a position of an athlete that performs the elements based on 3D sensing data that is acquired by sensing the series of exercise by the athlete of a sport scored by a judge and an element dictionary data in which characteristics of an element and a position of the sport scored by a judge are defined; identifying any one of an element and a position that is being displayed in a 3D model video based on the 3D sensing data corresponding to the series of exercise, based on the identification result; identifying, for the any one of the element and the position being displayed, time information corresponding to a boundary with any one of a next element and a next position; and highlighting a predetermined time portion from time corresponding to the time information, when information relating to changes over time is displayed for an evaluation index corresponding to a selection selected from among a plurality of selections relating to a plurality of evaluation indexes.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 7 is a diagram illustrating an example of a data structure of a sensing database (DB) according to the present embodiment;

FIG. 9 is a diagram illustrating an example of a data structure of a joint position DB according to the present embodiment;

FIG. 10 is a diagram illustrating an example of a data structure of a 3D model DB according to the present embodiment;

FIG. 11 is a diagram illustrating an example of a data structure of element dictionary data according to the present embodiment;

FIG. 12 is a diagram illustrating an example of a data structure of an element-identification result DB according to the present embodiment;

FIG. 16 is a diagram illustrating an example of a data structure of a video DB according to the present embodiment;

FIG. 17 is a diagram illustrating an example of a data structure of an evaluation index table according to the present embodiment;

DESCRIPTION OF EMBODIMENTS

When inquiries are made, the judges are to review a recorded video of the gymnast. For example, the elements include one that contains a position holding in which a predetermined posture is kept for a predetermined period (for example, 2 seconds) in a series of movement. The judges determine that the element is failed if the position holding is not kept for the predetermined time, and deduct scores. If the element subject to inquiry includes a position holding, rewinding, fast-forwarding, and the like are repeated to find a part corresponding to the position holding to be reproduced and reviewed. However, the gymnast is performing multiple elements in a series of exercise, and it makes it difficult to review the period of the concerned position holding, and to evaluate the element.

Accordingly, embodiments provide a display method, a display program, and an information processing device to support evaluation of a skill that is subject to be scored by a judge, and that includes a holding position.

Preferred embodiments will be explained with reference to accompanying drawings. Note that the embodiments are not intended to limit the present disclosure.

One performance (e.g., exercise) is composed of multiple techniques (e.g., elements) successively performed by an athlete. Moreover, one element is started from a starting position and ends in a finish position of the element. The finish position of the element is often a holding position in which a predetermined position is held. In the following description, the finish position and holding position in which a predetermined position is held for a predetermined period of time (for example, 2 seconds) are collectively referred to as "holding position".

Figure 1:
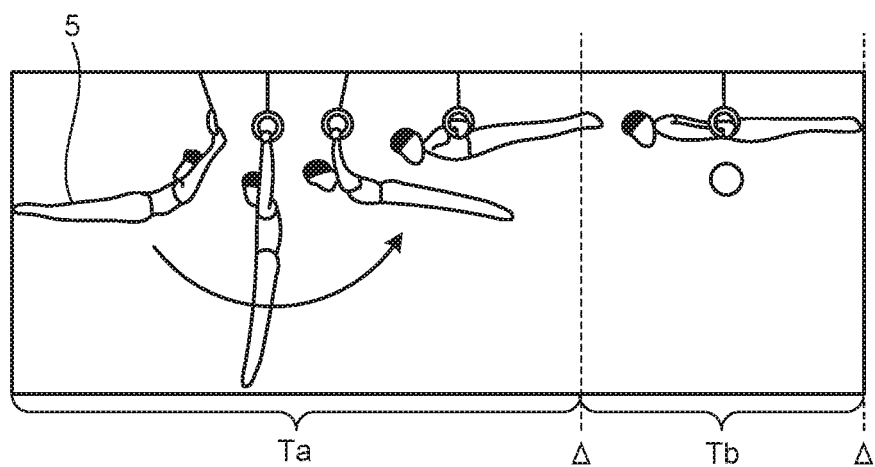
FIG. 1 is a diagram for describing an example of a starting position and a holding position.

FIG. 1 is a diagram for describing an example of a starting position and a holding position. FIG. 1 illustrates an example in which an athlete 5 performs an element, "back uprise maltese (2 seconds)" as one example. The athlete 5 takes a starting position "back uprise" in a period Ta, and takes a holding position, "maltese (2 seconds)". By combining this starting position, "back uprise" and the holding position, "maltese", the element, "back uprise maltese (2 seconds)" is composed. As above, when a starting position and a holding position are determined, an element is determined. When the period Tb of a holding position is shorter than 2 seconds, a judge determines that the element, "back uprise maltese (2 seconds)" is failed.

In FIG. 1, an end time of the period Ta (start time of the period Tb) corresponds to a pause of element or position. Moreover, when a next element continues after the element illustrated in FIG. 1, an end time of the period Tb corresponds to a pause of element or position. In the following description, a pause of element of position is simply referred to as "pause of element".

Figure 2:
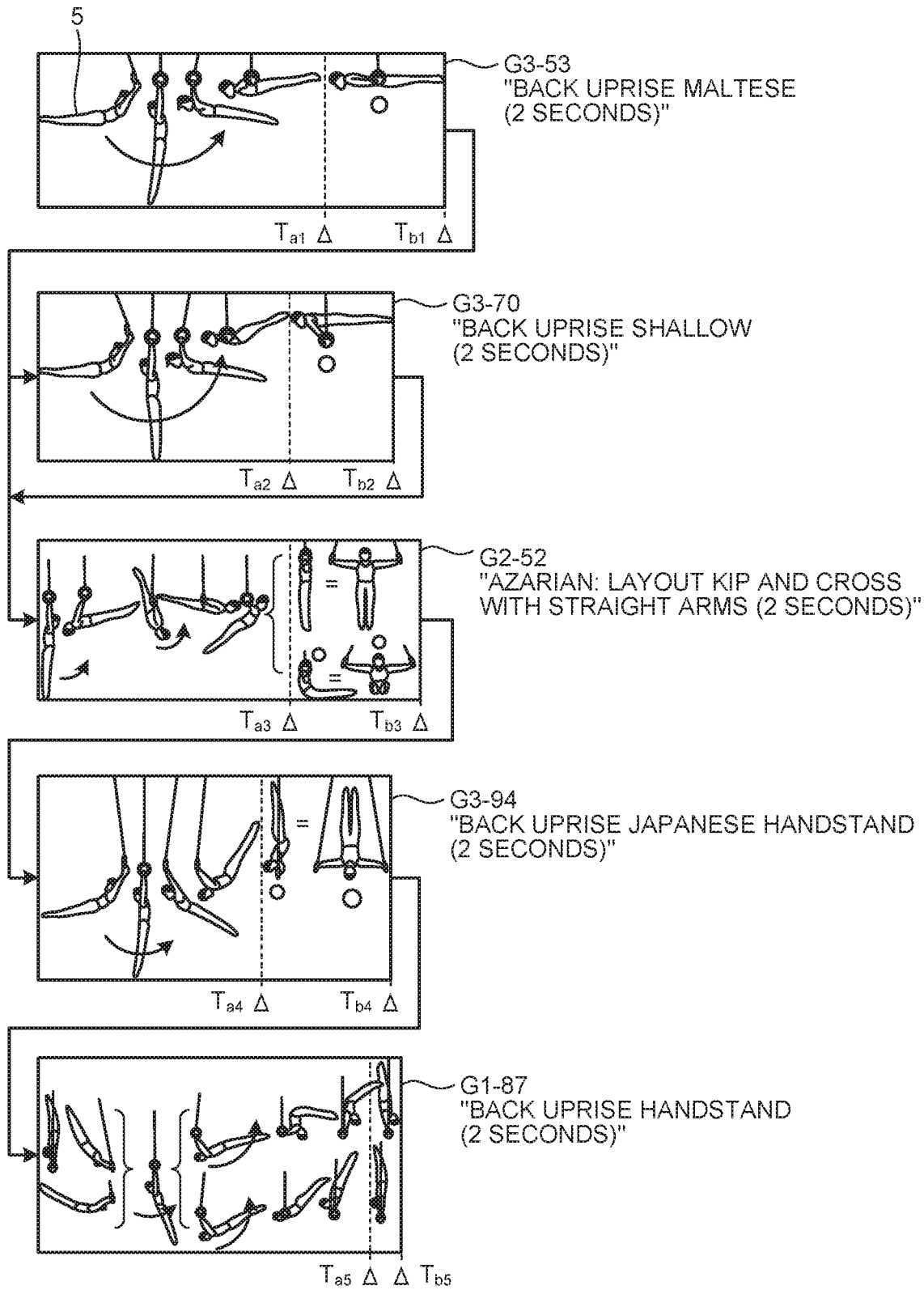
FIG. 2 is a diagram illustrating an example of a pause of elements included in an exercise.

As described in FIG. 1, one element is determined by combination of a starting position and a holding position, and one exercise is composed by an athlete performing multiple elements as illustrated in FIG. 2. FIG. 2 is a diagram illustrating an example of a pause of element included in an exercise. For example, a pause of element corresponds to a boundary with a next element or a next position. As illustrated in FIG. 2, after the element, "back uprise maltese (2 seconds)", the athlete 5 performs an element, "back uprise shallow", and then an element, "Azarian: layout kip and cross with straight arms (2 seconds)". After "Azarian", the athlete 5 performs "back uprise Japanese handstand (2 seconds)", and then "back uprise handstand (2 seconds)".

A pause of element of the element, "back uprise maltese (2 seconds)" corresponds to a start time Ta1 and an end time Tb1 of the holding position, "maltese (2 seconds)". A pause of element of the element, "back uprise shallow (2 seconds)" corresponds to a start time Ta2 and an end time Tb2 of the holding position, "shallow (2 seconds)".

A pause of element of the element, "Azarian: layout kip and cross with straight arms (2 seconds)" corresponds to a start time Ta3 and an end time Tb3 of the holding position, "cross". A pause of element of the element, "back uprise Japanese handstand (2 seconds)" corresponds to a start time Ta4 and an end time Tb4 of the holding position, "Japanese handstand (2 seconds)". A pause of element of the element, "back uprise shallow (2 seconds)" corresponds to a start time Ta5 and an end time Tb5 of the holding position, "handstand".

Each element is identified by an element number that is a combination of a group and a branch number. For example, the element number of the element, "back uprise maltese (2 seconds)" is "G3 (group)-53 (branch number)". The element number of the element, "back uprise shallow (2 seconds)" is "G3-70". The element number of the element, "Azarian: layout kip and cross with straight arms (2 seconds)" is "G2-52". The element number of the element, "back uprise Japanese handstand (2 seconds)" is "G3-94". The element number of the element, "back uprise handstand (2 seconds)" is "G1-87".

Next, a reference technique for achieving the present disclosure is described before escribing the present embodiment. This reference technique is not a related technique.

Figure 3:
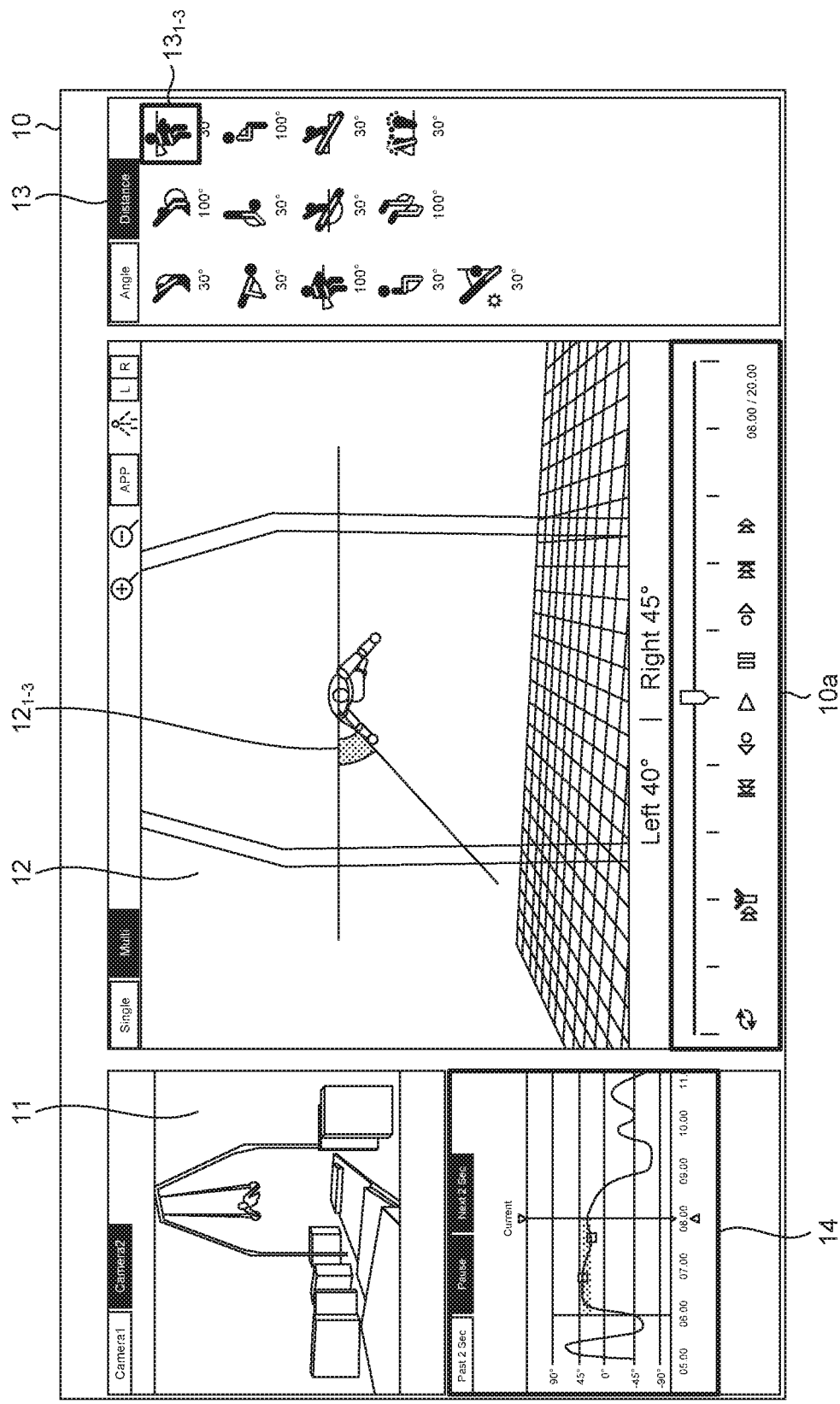
FIG. 3 is a diagram illustrating an example of a display screen that is generated by an information processing device of a reference technique.

FIG. 3 is a diagram illustrating an example of a display screen that is generated by an information processing device of the reference technique. As illustrated in FIG. 3, a display screen 10 includes regions 10a, 11, 12, 13, 14.

The region 10a is a region that includes buttons to control reproduction, stop, frame advance, fast-forward, rewind, and the like of a 3D model video. A judge presses respective buttons in the region 10a to control reproduction, stop, frame advance, fast-forward, rewind, and the like.

The region 11 is a region in which a video based on video data is displayed. A video displayed in the region 11 is reproduced, stopped, frame-advanced, fast-forwarded, rewound, and the like according to a button pressed in the region 10a.

The region 12 is a region in which a 3D model video is displayed from a virtual eyepoint that is specified in advance. The 3D model video displayed in the region 12 is reproduced, stopped, frame-advanced, fast-forwarded, rewound, and the like according to a button pressed in the region 10a.

The region 13 is a region in which icons of evaluation index related to respective elements are displayed. The evaluation indexes are indexes to determine a score for an element, and the score decreases as the evaluation index diverges from an ideal value. The evaluation index includes an angle formed between one straight line passing through multiple joints of the athlete and another straight line passing through plural straight lines (joint angle), a distance between the one straight line and the other straight line, an angle formed between a reference line (reference plane) and the one straight line, and the like. As an example, the evaluation index includes a knee angle, an elbow angle, a shoulder angle, a distance between knees, a distance between one joint position of the athlete and a normal, and the like.

The judge selects either icon out of the icons displayed in the region 13. For example, when an icon $13_{1-3}$ corresponding to a shoulder angle is selected, the information processing device displays supplementary information $12_{1-3}$ related to the shoulder angle.

The region 14 is a region in which a graph that indicates information relating to changes over time chronologically for the evaluation index of the selected icon is displayed. The judge refers to a graph in the region 14, and thereby determines whether the holding position performed by the athlete satisfies requirements. The requirements of a holding position include holding a position for a predetermined period of time (2 seconds) by an athlete. For example, when the icon $13_{1-3}$ corresponding to a shoulder angle is selected, an information processing device 70 chronologically displays changes of a shoulder angle over time in a graph. When a difference between a maximum value and a minimum value is small, it is determined that the athlete is holding a position (as for a part around the shoulder).

Figure 4:
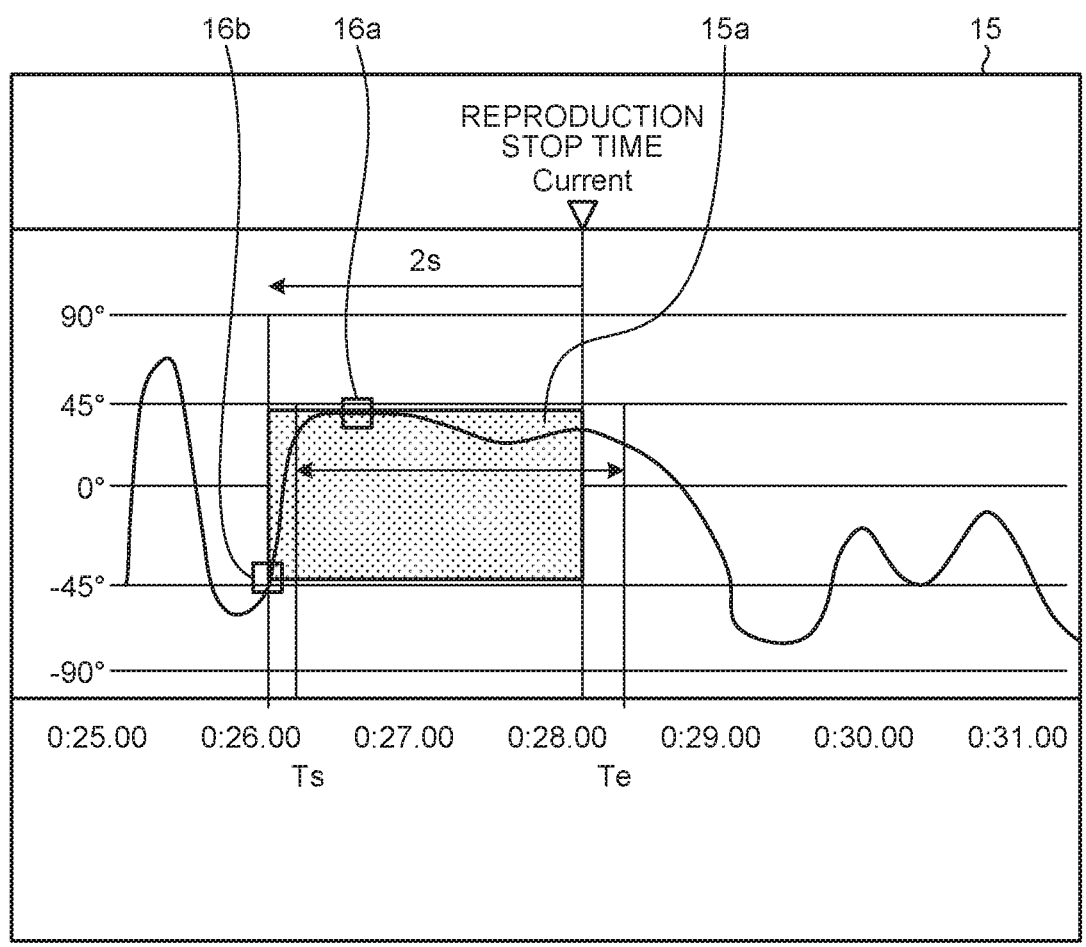
FIG. 4 is a diagram illustrating an example of a graph of a reference technique.

FIG. 4 is a diagram illustrating an example of a graph of the reference technique. A vertical axis of a graph 15 is for a value relating to the evaluation index and, for example, corresponds to a shoulder angle. A horizontal axis of the graph 15 is for time. When evaluating a holding position of an athlete, the judge refers to a 3D model video in the region 12 illustrated in FIG. 3, and upon recognizing that the position of the athlete is in a holding position, presses a stop button in the region 10a. For example, a timing (a time) when the judge presses the stop button is "current".

When the stop button is pressed, the information processing device highlights a predetermined time portion 15a between "current" and a predetermined preceding time (for example, 2 seconds before) in the graph 15. Moreover, the information processing device displays a marker 16a that indicates a maximum value and a marker 16b that indicates a minimum value of the shoulder angle in the predetermined time portion 15a. The judge refers to the predetermined time portion 15a of the graph 15 displayed in the region 14, and determines whether the position of the athlete is in a holding position for "2 seconds" or more that satisfies the requirement of the holding position. When a difference between the maximum value and the minimum value is large, it is determined that the athlete is not holding the position.

According to the reference technique, a predetermined time is highlighted in the graph based on a time currently displayed in the region 11. Therefore, a stop time can be prior to an actual end time of a holding position, and the judge can erroneously determine that a holding period of time in the holding position is not enough. When it is assumed that a period of the holding position that is actually taken by the athlete is time Ts to Te, in the example in FIG. 4, "current" corresponds to a preceding time relative to an end time Ts of the holding position, and a difference between the marker 16a and the marker 16b is large in the predetermined time portion 15a. In this case, the judge can make a judgment that the holding position made by the athlete does not satisfy the requirement.

On the other hand, when it is assumed that a period of the holding position that is actually taken by the athlete is time Ts to Te, because a difference between the maximum value and the minimum value in time Ts to Te is smaller than a threshold, it can be determined that the athlete is holding the position in time Ts to Te. Furthermore, the period of time Ts to Te is 2 seconds or longer, and the requirement for the holding position is satisfied. That is, the reference technique can fail to support judges to evaluate a holding position of an athlete.

Figure 5:
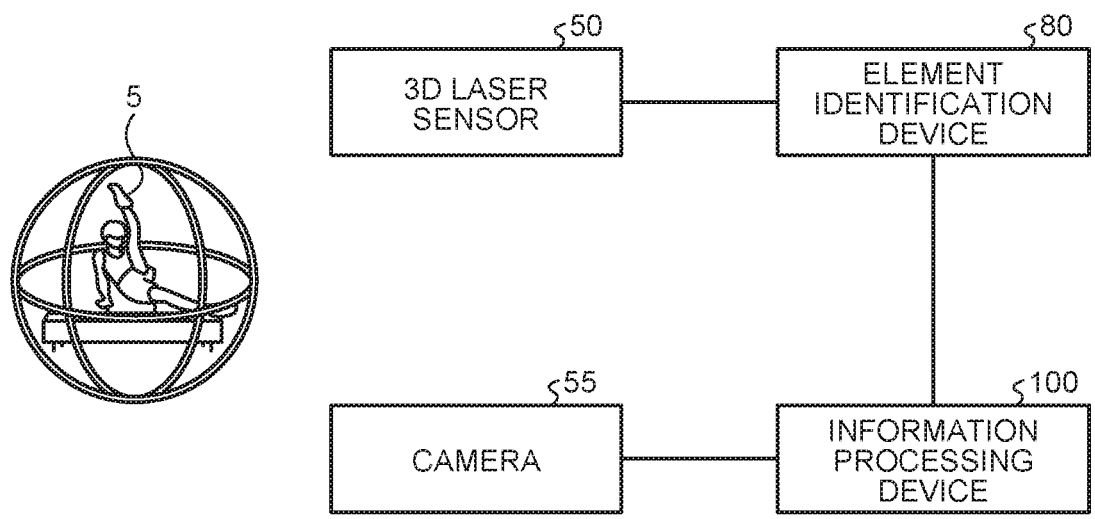
FIG. 5 is a diagram illustrating an example of a system according to a present embodiment.

Next, an example of a system according to the present embodiment is described. FIG. 5 is a diagram illustrating an example of the system according to the present embodiment. As illustrated in FIG. 5, this system includes a 3D laser sensor 50, a camera 55, an element identification device 80, and an information processing device 100. A case in which the athlete 5 performs a gymnastic exercise in front of the 3D laser sensor 50 and the camera 55 is described as an example, but it is also applicable to a case in which the athlete 5 performs other kinds of events scored by judges, similarly.

For example, the other kinds of sporting events scored by judges include trampoline, diving, figure skating, karate forms, ballroom dance, snowboard, skateboard, aerial skiing, and surfing. Furthermore, it may be applied to classical ballet, ski jumping, airs and turns in mogul skiing, form check in baseball or basketball, and the like. Moreover, it may be applied to sports, such as Kendo, judo, wrestling, and sumo.

The 3D laser sensor 50 is a sensor that performs 3D sensing with respect the athlete 5. The 3D laser sensor 50 outputs 3D sensing data that is a sensing result to an identification device 60. In the following description, the 3D sensing data is simply referred to as "sensing data". The sensing data includes plural frames. A frame includes a frame number and distance information about a distance to respective points on the athlete 5. Numbers are assigned to the respective frames in ascending order.

The camera 55 is a device that acquires video data of the athlete 5. The camera 55 outputs video data to the information processing device 100. The video data includes plural frames corresponding to images of the athlete 5, and a frame number is assigned to each frame. The frame number of the video data and the frame number of the sensing data are synchronized. Moreover, in the following description, a frame included in the sensing data is referred to as "sensing frame", and the frame of the video data is referred to as "video frame" as appropriate.

The element identification device 80 generates 3D model data based on the sensing data that is sensed by the 3D laser sensor 50. The element identification device 80 identifies an event and an element that is performed by the athlete 5 based on the 3D model data. The element identification device 80 outputs the 3D model data and identification result data to the information processing device 100. The identification result data includes a frame number, an identified event and an element. This identification result data also includes a position identification result.

Figure 6:
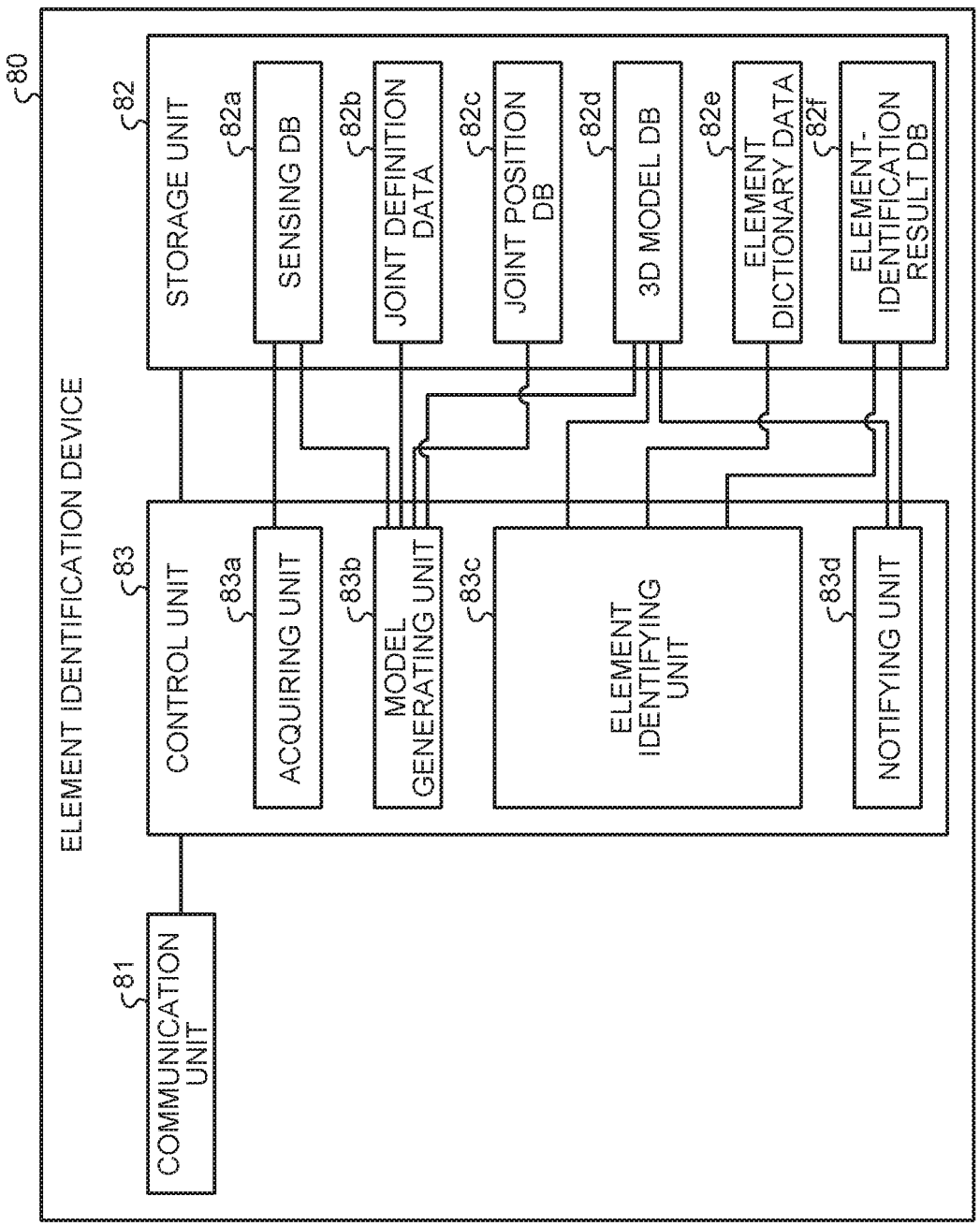
FIG. 6 is a functional block diagram illustrating a configuration of an element identification device according to the present embodiment.

FIG. 6 is a functional block diagram illustrating a configuration of the element identification device according to the present embodiment. As illustrated in FIG. 6, this element identification device 80 includes a communication unit 81, a storage unit 82, and a control unit 83.

The communication unit 81 is a processing unit that performs data communication with the information processing device 100. The communication unit 81 corresponds to a communication device.

The storage unit 82 includes a sensing DB 82a, joint definition data 82b, a joint position DB 82c, a 3D model DB 82d, element dictionary data 82e, and an element-identification result DB 82f. The storage unit 82 corresponds to a storage device, such as a semiconductor memory device including a random access memory (RAM), a read-only memory (ROM), and a flash memory, and a hard disk drive (HDD).

The sensing DB 82a is a DB that stores sensing data acquired from the 3D laser sensor 50. FIG. 7 is a diagram illustrating an example of a data structure of the sensing DB according to the present embodiment. As illustrated in FIG. 7, this sensing DB 82a associates an exercise identification (ID), a frame number, and a frame with one another. The exercise ID is information uniquely identifying one exercise by the athlete 5. The frame number is a number uniquely identifying each sensing frame that is associated with the same exercise ID. The sensing frame is a frame included in the sensing data that is sensed by the 3D laser sensor 50.

Figure 8:
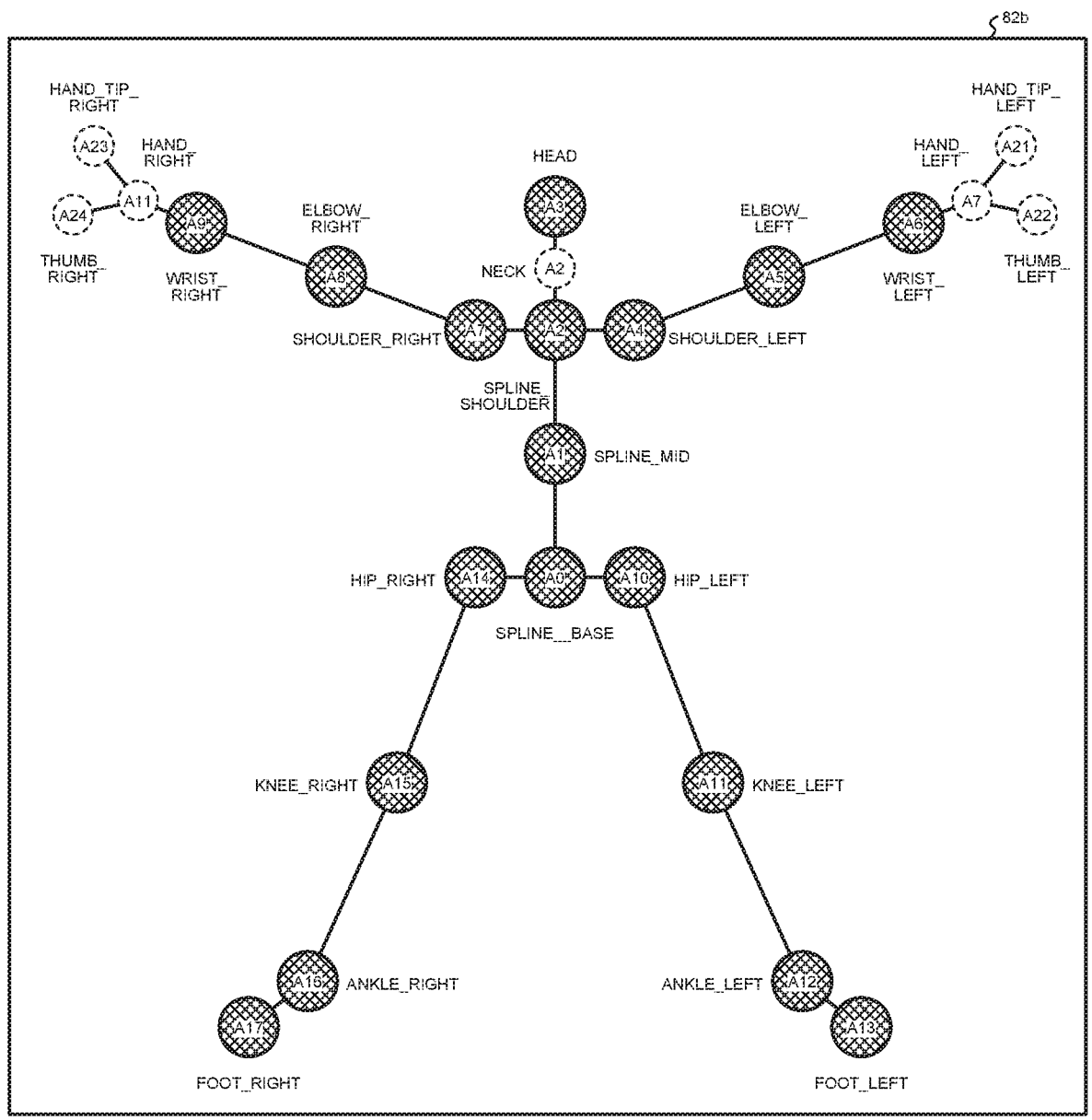
FIG. 8 is a diagram illustrating an example of a data structure of joint definition data according to the present embodiment.

The joint definition data 82b is data that defines each joint position of the athlete 5. FIG. 8 is a diagram illustrating an example of a data structure of the joint definition data according to the present embodiment. As illustrated in FIG. 8, the joint definition data 82b stores information in which respective joints that are identified by a publicly known skeleton model are numbered. For example, as illustrated in FIG. 8, A7 is assigned to a right shoulder joint (SHOULDER_RIGHT), A5 is assigned to a left elbow joint (ELBOW_LEFT), A11 is assigned to a left knee joint (KNEE_LEFT), and A14 is assigned to a right hip joint (HIP_RIGHT). In the present embodiment, there is a case in which an X coordinate of the right shoulder joint of A8 is expressed as X8, a Y coordinate thereof is expressed as Y8, and a Z coordinate thereof is expressed as Z8.

The joint position DB 82c is position data of respective joints of the athlete 5 that is generated based on the sensing data of the 3D laser sensor 50. FIG. 9 is a diagram illustrating an example of a data structure of the joint position DB according to the present embodiment. As illustrated in FIG. 9, this joint position DB 82c associates an exercise ID, a frame number, and "X0, Y0, Z0, . . . , X17, Y17, Z17" with one another. Explanation about the exercise ID is the same as the explanation in the sensing DB 82a.

In FIG. 9, the frame number is a number uniquely identifying each sensing frame that is associated with the same exercise ID. "X0, Y0, Z0, . . . , X17, Y17, Z17" is XYZ coordinates of the respective joints. For example, "X0, Y0, Z0" is a three-dimensional coordinates of a joint of A0 in FIG. 8.

FIG. 9 illustrates chronological changes of the respective joints in the sensing data of an exercise ID "P101", and it is indicated that the positions of the respective joints are "X0=100, Y0=20, Z0=0, . . . , X17=200, Y17=40, Z17=5" for a frame number "1". For a frame number "2", it is indicated that the positions of the respective joints are shifted to "X0=101, Y0=25, Z0=5, . . . , X17=202, Y17=39, Z17=15".

The 3D model DB 82d is a database that stores 3D model data of the athlete 5 generated based on the sensing data. FIG. 10 is a diagram illustrating an example of a data structure of the 3D model DB according to the present embodiment. As illustrated in FIG. 10, the 3D model DB 82d associates an exercise ID, a frame number, skeleton data, and 3D data model with one another. Explanation about the exercise ID and the frame number is the same as the explanation in the sensing DB 82a.

The skeleton data is data identifying a skeleton frame of the athlete 5 estimated by connecting the respective joint positions. The 3D model data is data of the 3D model data of the athlete 5 estimated based on the information acquired from the sensing data and the skeleton data.

The element dictionary data 82e is dictionary data that is used when identifying an element included in an exercise by the athlete 5. FIG. 11 is a diagram illustrating an example of a data structure of the element dictionary data according to the present embodiment. As illustrated in FIG. 11, this element dictionary data 82e associates an event, an element number, an element name, and a requirement with one another. The event indicates an event of exercise. The element number is information uniquely identifying an element. The element name is a name of an element. The requirement indicates a requirement of an element to be regarded successful. The requirement includes respective joint positions, respective joint angles, movement of respective joint positions, and the like for an element to be regarded successful. When the element includes a holding position, the requirement includes a requirement for the holding position. Although illustration is omitted, information indicating whether a holding position is included may be set for each element number in the element dictionary data 82e. Moreover, the requirement may include a requirement of a position. Furthermore, the element dictionary data 82e may associate this requirement for a position and a position name with each other.

The element-identification result DB 82f is a database that stores an identification result of an element. FIG. 12 is a diagram illustrating an example of a data structure of the element-identification result DB according to the present embodiment. As illustrated in FIG. 12, the element-identification result DB 82f associates an event, an exercise ID, an element number, a first start time, a first end time, a flag, a second start time, a second end time, and an element name with one another.

Explanation about the event, the element number, and the element name is the same as explanation in the element dictionary data 82e. The first start time indicates a start time of each element. The exercise ID is information uniquely identifying an element. The first end time indicates an end time of each element. The flag is information indicating whether a holding position is included in a concerned element. When a holding position is included in an element, the flag is to be "ON". When a holding position is not included in an element, the flag is to be "OFF".

The second start time indicates a start time of a holding position included in an element. The second end time indicates an end time of a holding position included in an element. In the example in FIG. 12, the sequence of elements performed by a performer is "G3-53, G2-52, G1-87, G1-51, G1-52, G3-16, G1-49, G3-69, G1-81, G1-26, G4-41".

Returning to description of FIG. 6, the control unit 83 includes an acquiring unit 83a, a model generating unit 83b, an element identifying unit 83c, and a notifying unit 83d. The control unit 83 can be implemented by a central processing unit (CPU), a micro processing unit (MPU), or the like. Moreover, the control unit 83 can be implemented also by wired logic, such as an application specific integrated circuit (ASIC) and a field programmable gate array (FPGA).

The acquiring unit 83a is a processing unit that acquires sensing data from the 3D laser sensor 50. The acquiring unit 83a stores the acquired sensing data in the sensing DB 82a.

The model generating unit 83b is a processing unit that generates a 3D model data corresponding to respective frame numbers of respective exercise IDs based on the sensing DB 82a. In the following, an example of processing by the model generating unit 83*b* is described. The model generating unit 83*b* compares a sensing frame in the sensing DB 82*a* with positional relationship of respective joints defined by the joint definition data 82*b*, to identify a type of respective joints included in the sensing frame and three-dimensional coordinates of the joints. The model generating unit 83*b* repeats the above processing for respective frame numbers of each exercise ID to generate the joint position DB 82*c*.

The model generating unit 83*b* generates skeleton data by connecting the three-dimensional coordinates of the respective joints stored in the joint position DB 82*c* based on the connection relationship defined by the joint definition data 82*b*, to generate the skeleton data. Moreover, the model generating unit 83*b* generates 3D model data by applying the estimated skeleton data to a skeleton model matched with a body frame of the athlete 5. The model generating unit 83*b* repeats the above processing for respective frame numbers of each exercise ID, to generate the 3D model DB 82*d*.

The element identifying unit 83*c* checks the respective skeleton data stored in the 3D model DB 82*d* sequentially following through the frame numbers, and compares the respective skeleton data with the requirement stored in the element dictionary data 82*e*, to determine whether a requirement is hit. When a requirement is hit, the element identifying unit 83*c* identifies an event, an element number and an element name corresponding to the hit requirement. Moreover, the element identifying unit 83*c* converts a starting frame number of a series of frames for which the requirement is hit into the first start time based on predetermined frames per second (FPS), and converts an ending frame number of the series of frame numbers into the first end time. The element identifying unit 83*c* stores the event, the exercise ID, the element number, the first start time, the first end time, and the element name in the element-identification result DB 82*f* in an associated manner. Furthermore, the element identifying unit 83*c* may further identify a requested position by comparing the respective skeleton data and requirements stored in the element dictionary data 82*e*.

The element identifying unit 83*c* determines whether the identified element includes a holding position. When the element does not include a holding position, the element identifying unit 83*c* sets the flag in the element-identification result DB 82*f* to "OFF". On the other hand, when the element includes a holding position, the element identifying unit 83*c* sets the flag in the element-identification result DB 82*f* to "ON". The element-identification result DB 82*f* stores a start time of the holding position as the second start time, and an end time of the holding position as the second end time in the element-identification result DB 82*f*. Note that the "time" herein is an example of time information. For example, the time information may be information including a date and a time, or may be one indicating elapsed time from a start of an exercise.

The element identifying unit 83*c* repeats the above processing each time a requirement is hit, and thereby generate the element-identification result DB 82*f*.

The notifying unit 83*d* is a processing unit that transmits information of the 3D model DB 82*d* and information of the element-identification result DB 82*f* to the information processing device 100.

Figure 13:
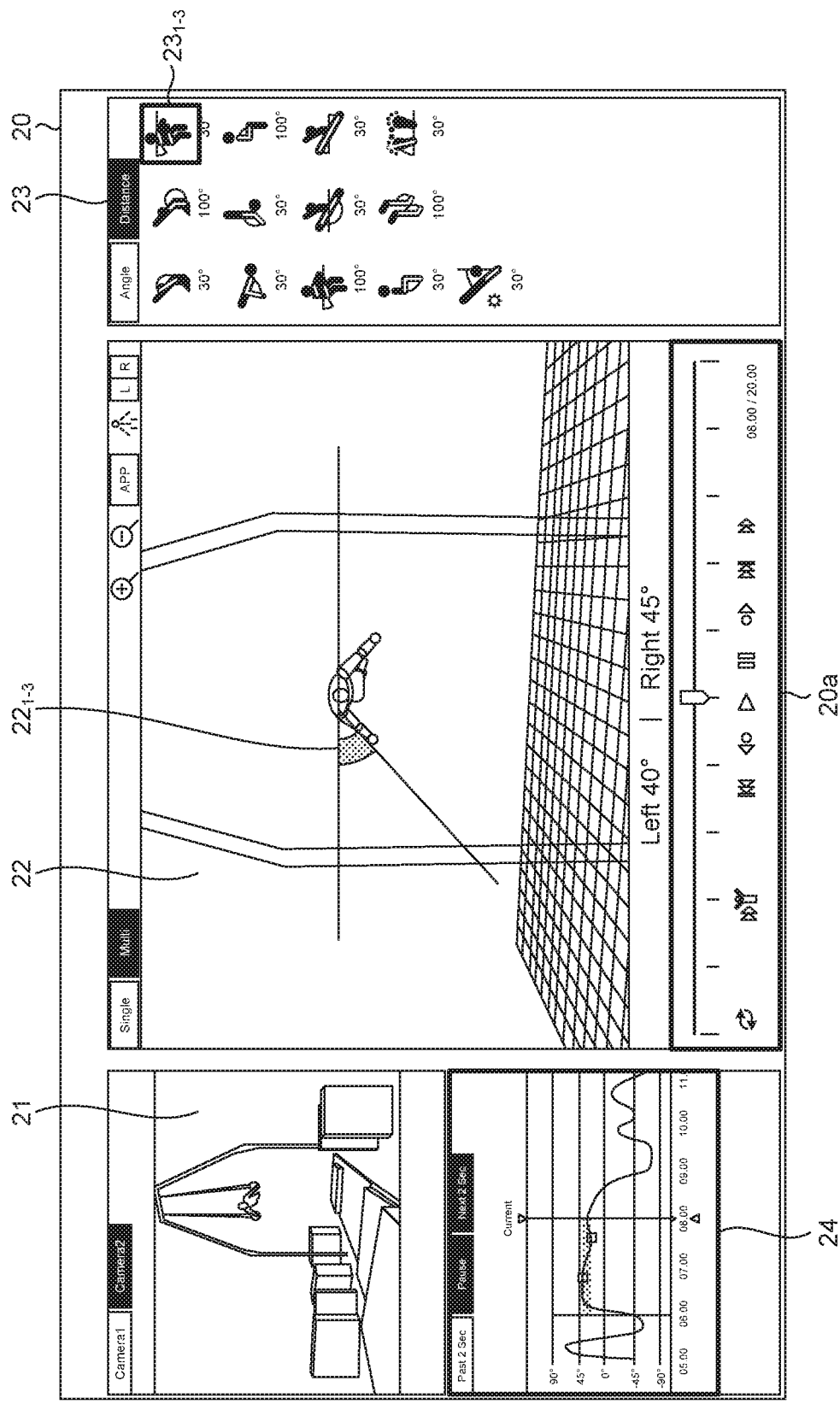
FIG. 13 is a diagram illustrating an example of a display screen that is generated by the information processing device according to the present embodiment.

Returning back to description of FIG. 5, the information processing device 100 is a processing unit that generates information of a display screen in which a video and the 3D model video are displayed, to cause a display unit (not illustrated) to display it. FIG. 13 is a diagram illustrating an example of the display screen that is generated by the information processing device according to the present embodiment. As illustrated in FIG. 13, this display screen 20 includes regions 20*a*, 21, 22*a* to 22*d*, and 23.

The region 20*a* is a region that includes buttons to control reproduction, stop, frame advance, fast-forward, rewind, and the like of a 3D model video. A judge presses respective buttons in the region 20*a* to control reproduction, stop, frame advance, fast-forward, rewind, and the like of the video and the 3D model video.

The region 21 is a region in which a video based on video data is displayed. A video displayed in the region 21 is reproduced, stopped, frame-advanced, fast-forwarded, rewound, and the like according to a button pressed in the region 20*a*.

The region 22 is a region in which a 3D model video is displayed from a virtual eyepoint that is specified in advance. The 3D model video displayed in the region 22 is reproduced, stopped, frame-advanced, fast-forwarded, rewound, and the like according to a button pressed in the region 20*a*.

The region 23 is a region in which icons of evaluation index related to respective elements are displayed. The evaluation indexes are indexes to determine a score for an element, and the score decreases as the evaluation index diverges from an ideal value. The evaluation index includes an angle formed between one straight line passing through multiple joints of the athlete 5 and another straight line passing through plural straight lines (joint angle), a distance between the one straight line and the other straight line, an angle formed between a reference line (reference plane) and the one straight line, and the like. As an example, the evaluation index includes a knee angle, an elbow angle, a shoulder angle, a distance between knees, a distance between one joint position of the athlete and a normal, and the like.

The judge selects either icon out of the icons displayed in the region 23. For example, when an icon 23$_{1-3}$ corresponding to a shoulder angle is selected, the information processing device displays supplementary information 22$_{1-3}$ related to the shoulder angle.

The region 24 is a region in which a graph that indicates information relating to changes over time chronologically is displayed, for the evaluation index of the selected icon. The judge refers to a graph in the region 24, and thereby determines whether the holding position performed by the athlete satisfies requirements. The requirements of a holding position include holding a position for a predetermined period of time (2 seconds) by the athlete 5. For example, when the icon 23$_{1-3}$ corresponding to a shoulder angle is selected, the information processing device 100 chronologically displays changes of a shoulder angle over time in a graph. When a difference between a maximum value and a minimum value is small, it is determined that the athlete 5 is holding a position (as for a part around the shoulder).

Figure 14:
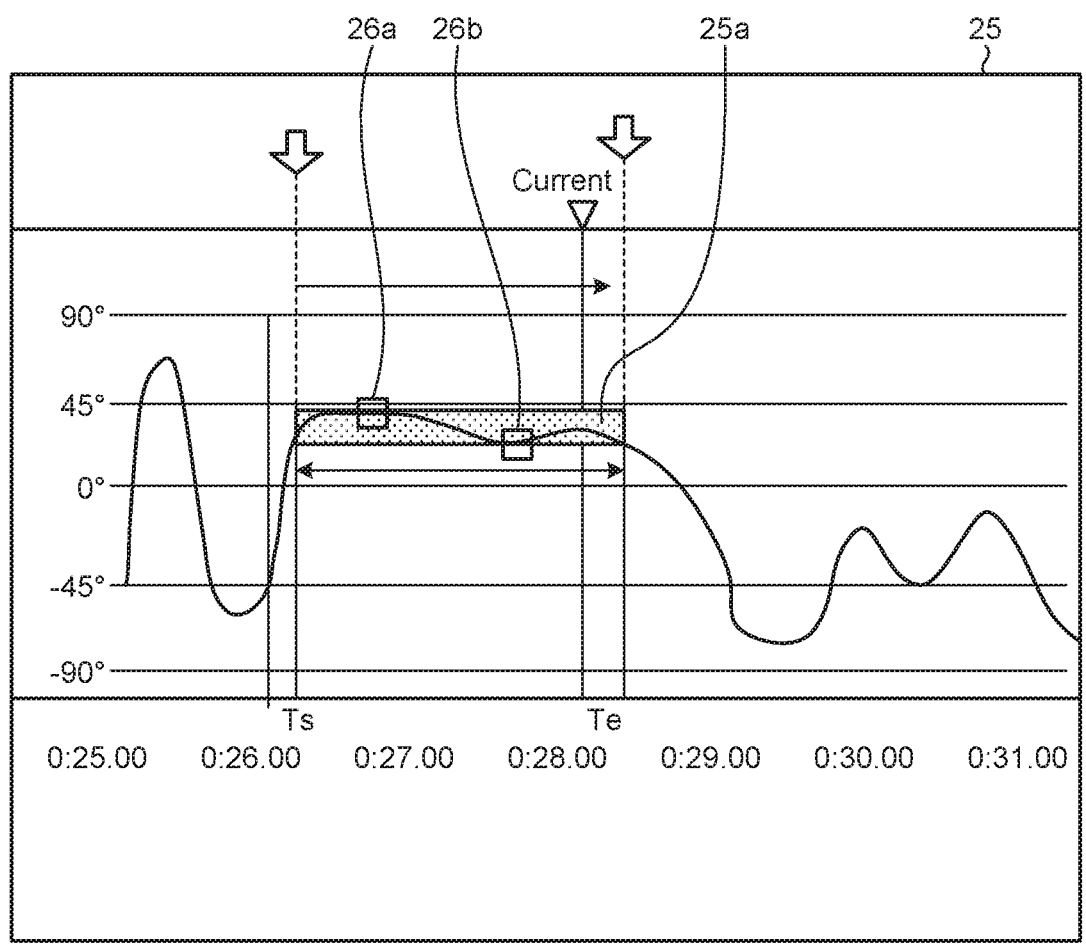
FIG. 14 is a diagram illustrating an example of a graph according to the present embodiment.

FIG. 14 is a diagram illustrating an example of a graph according to the present embodiment. A vertical axis of a graph 25 is for a value relating to the evaluation index and, for example, corresponds to a shoulder angle. A horizontal axis of the graph 25 is an axis corresponding to time. When evaluating a holding position of an athlete 5, the judge refers to a 3D model video in the region 22 illustrated in FIG. 14, and upon recognizing that the position of the athlete is in a holding position, presses a stop button in the region 20*a*. For example, a timing (a time) when the judge presses the stop button, or a time when it is reproduced is "current".

When the stop button is pressed, the information processing device 100 identifies an element that is performed by the athlete 5 at "current". Regardless of being paused, the information processing device 100 identifies an element that is performed by the athlete 5 at the time of reproduction "current". The information processing device 100 identifies a second end time "Te" of the holding position included in the identified element, and highlights a predetermined time portion 25*a* between the second end time and a predetermined preceding time (for example, 2 seconds before).

The information processing device 100 displays a marker 26*a* that indicates a maximum value and a marker 26*b* that indicates a minimum value of the shoulder angle in the predetermined time portion 25*a*. The judge refers to the predetermined time portion 25*a* of the graph 25 displayed in the region 24, and determines whether the position of the athlete 5 is held for "2 seconds" or more that satisfies the requirement of the holding position. When a difference between the maximum value and the minimum value is large, it is determined that the athlete 5 is not holding the position.

AS illustrated in FIG. 14, the information processing device 100 according to the present embodiment highlights the predetermined time portion 25*a* between a second holding time of the holding position included in the element and a predetermined preceding time (for example, 2 seconds before). Unlike the reference technique described in FIG. 4, the information processing device 100 highlights the predetermined time portion 25*a* from the second holding time and a predetermined preceding time as long as a holding position is included in an element that is performed by the athlete 5 at a time when a judge presses the stop button. Therefore, the judge can determine whether the requirement of the holding position is satisfied appropriately. Moreover, compared with the display method of the graph in the reference technique, an erroneous judgment by a judge can be well suppressed and, therefore, the accuracy in determining a score is improved.

Figure 15:
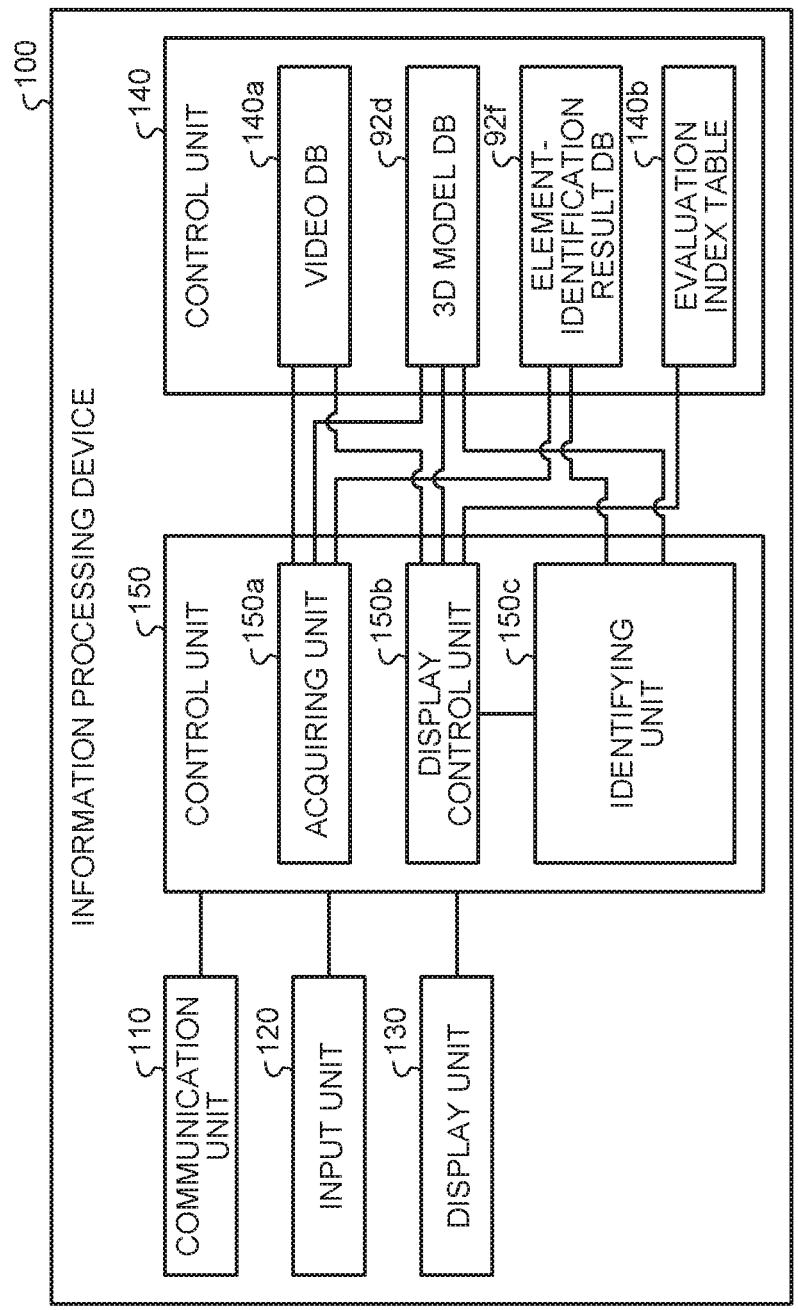
FIG. 15 illustrates a configuration of the information processing device according to the present embodiment.

Next, a configuration of the information processing device 100 according to the present embodiment is described. FIG. 15 illustrates a configuration of the information processing device according to the present embodiment. As illustrated in FIG. 15, the information processing device 100 includes a communication unit 110, an input unit 120, a display unit 130, a storage unit 140, and a control unit 150.

The communication unit 110 is a processing unit that performs data communication with the camera 55 and the element identification device 80. For example, the communication unit 110 receives information of the 3D model DB 82*d* and information of the element-identification result DB 82*f* from the element identification device 80, and outputs the received information of the 3D model DB 82*d* and information of the element-identification result DB 82*f* to the control unit 150. Moreover, the communication unit 110 receives video data from the camera 55, and outputs the received video data to the control unit 150. The control unit 150 described later communicates data with the camera 55 and the element identification device 80 through the communication unit 110.

The input unit 120 is an input device to input various kinds of information to the information processing device 100. For example, the input unit 120 corresponds to a keyboard, a mouse, a touch panel, and the like. A judge operates the input unit 120 and selects a button in the region 20*a* on the display screen 20 illustrated in FIG. 13 and the like, and thereby controls reproduction, stop, frame advance, fast-forward, rewind, and the like of a video and a 3D model video. A judge presses respective buttons in the region 10*a* to control reproduction, stop, frame advance, fast-forward, rewind, and the like. Moreover, by operating the input unit 120, the judge selects an icon included in the region 23 of the display screen 20 illustrated in FIG. 13.

The display unit 130 is a display device that displays various kinds of information output from the control unit 150. For example, the display unit 130 displays information of the display screen 20 illustrated in FIG. 13 and the like. Furthermore, a judge presses an icon included in the region 23, and thereby switches graphs of evaluation indexes to be display in the region 24.

The storage unit 140 includes a video DB 140*a*, a 3D model DB 92*d*, an element-identification result DB 92*f*, and an evaluation index table 140*d*. The storage unit 140 corresponds to a semiconductor memory device, such as a RAM, a ROM, and a flash memory, and a storage device, such as an HDD.

The video DB 140*a* is a database that stores video frames. FIG. 16 is a diagram illustrating an example of a data structure of the video DB according to the present embodiment. As illustrated in FIG. 16, this video DB 140*a* associates an exercise ID, a frame number, and a video frame with one another. The exercise ID is information uniquely identifying one exercise by the athlete 5. The frame number is a number uniquely identifying respective video frames corresponding to the same exercise ID. The video frame is a frame included video data that is acquired by the camera 55. The frame number of the sensing frame illustrated in FIG. 7 and the frame number of the video frame are synchronized.

The 3D model DB 92*d* is a database that stores information of a 3D model of the athlete 5 generated by the element identification device 80. A data structure of the 3D model DB 92*d* is the same as the data structure of the 3D model DB 82*d* described in FIG. 10.

The element-identification result DB 92*f* is a database that stores information an identification result of respective elements included in a series of exercise generated by the element identification device 80. A data structure of the element-identification result DB 92*f* is the same as the data structure of the element-identification result DB 82*f* described in FIG. 12.

The evaluation index table 140*b* is a table that holds various kinds of information relating to evaluation indexes of the icons. FIG. 17 is a diagram illustrating an example of a data structure of the evaluation index table according to the present embodiment. As illustrated in FIG. 17, this evaluation index table 140*b* associates an icon identification number, an icon image, an evaluation index, and a definition with one another.

The icon identification number is information uniquely identifying an icon. The icon image is an image of each icon illustrated in the region 23 in FIG. 13. The evaluation index is an index to determine a score of an element. The definition indicates definition to acquire an evaluation index of the athlete 5 from the skeleton data. For example, an evaluation index is defined by a straight line connecting one joint and another joint among plural joints included in the skeleton data, an angle formed by two straight lines (joint angle), and the like.

Returning back to description of FIG. 15, the control unit 150 includes an acquiring unit 150*a*, a display control unit 150*b*, and an identifying unit 150*c*. The control unit 150 can be implemented by hardware logic, such as ASIC and FPGA.

The acquiring unit 150*a* acquires video data from the camera 55, and stores the acquired video data in the video DB 140*a*. The acquiring unit 150*a* acquires information of the 3D model DB 82*d* and information of the element-identification result DB 82*f* from the element identification device 80, and stores the acquired 3D model DB 82*d* in the 3D model DB 92*d*. Moreover, the acquiring unit 150*a* stores the information of the element-identification result DB 82*f* in the element-identification result DB 92*f*.

The display control unit 150*b* is a processing unit that generates information of the display screen 20 illustrated in FIG. 13, to display on the display unit 130. The display control unit 150*b* sequentially reads video frames from the video DB 140*a*, and reproduces the video in the region 21 of the display screen 20.

The display control unit 150*b* sequentially reads 3D model data from the 3D model DB 92*d*, and reproduces the 3D model video in the region 22 of the display screen 20. The respective 3D model videos displayed in the region 22 are videos of a 3D model data shot from a virtual eyepoint specified in advance.

The display control unit 150*b* performs reproduction, synchronizing a time (frame number) of a video displayed in the region 21 and a time (frame number) of each 3D model video displayed in the region 22. When a button displayed in the region 20*a* is pressed by a judge, the display control unit 150*b* performs reproduction, stop, frame advance, fast-forward, rewind, and the like of the video in the region 21 and the 3D model video in the region 22 according to the pressed button.

The display control unit 150*b* outputs information of a reproduction time of the 3D model video that is currently displayed in the region 22 to the identifying unit 150*c*. In the following description, the reproduction time of the 3D model video currently displayed in the region 22 is simply referred to as "reproduction time". This reproduction time corresponds to "current" indicated in the graph in FIG. 14. Note that the present embodiment is described by using the reproduction time, but it may be a display time of the regions 21, 22.

The display control unit 150*b* refers to the evaluation index table 140*b*, and acquires icon images of icons, and displays the respective icons in the region 23 of the display screen 20. When either icon is selected out of the icons displayed in the region 23 of the display screen 20, the display control unit 150*b* generates a graph of an evaluation index corresponding to the selected icon, and displays the graph in the region 24.

An example of processing of generating a graph by the display control unit 150*b* is described. The display control unit 150*b* compares an icon identification number of the icon selected by the judge with the evaluation index table 140*b*, and identifies an evaluation index relating to the selected icon. The display control unit 150*b* compares definition of the identified evaluation index with the skeleton data of the 3D model DB 92*d*, to calculate a value of changes over time relating to the evaluation index. For example, the display control unit 150*b* identifies a time Ths predetermined time before the reproduction time and a time The predetermined time after the reproduction time. The display control unit 150*b* calculates a value of changes over time relating to the evaluation index of the times Ths to The based on the skeleton data of the time Ths to The, to generate a graph.

The display control unit 150*b* acquires identification information from the identifying unit 150*c* described later. The identification information includes a second start time and a second end time of a holding position. The display control unit 150*b* highlights a predetermined time portion between the second end time and a predetermine preceding time in the graph generated by the above processing. In the graph 25 illustrated in FIG. 14, the predetermined time portion 25*a* is highlighted. Moreover, the display control unit 150*b* scans values of changes over time of the evaluation index included in the predetermined time portion, identifies a maximum value and a minimum value, and sets markers at portions corresponding to the maximum value and the minimum value. The display control unit 150*b* may display values of the maximum value and the minimum value included in the predetermined time portion on the display screen.

When either icon is selected by a judge from among the icons (icon images) displayed in the region 23 of the display screen 20, the display control unit 150*b* displays supplementary information corresponding to icon identification information of the selected icon, superimposing on the 3D model video in the region 22. In the example illustrated in FIG. 13, supplementary information $22_{1-3}$ relating to a shoulder angle is displayed. The supplementary information corresponding to the icon identification information is assumed to be set in advance. Moreover, the display control unit 150*b* may display a value corresponding to the evaluation index calculated when the graph describe above is generated, along with the supplementary information of the 3D model video.

The identifying unit 150*c* is a processing unit that generates identification information based on information about a reproduction time from the display control unit 150*b*, and that outputs the identification information to the display control unit 150*b*. For example, the identifying unit 150*c* compares the reproduction time with the element-identification result DB 92*f*, to identify an element number associated with the reproduction time. When the flag associated with the element number is "OFF", the identifying unit 150*c* skips the processing without generating the identification information.

When the flag associated with the element number is "ON", the identifying unit 150*c* acquires the second start time and the second end time associated with the element number, and generates identification information that includes the acquired second start time and second end time. The identifying unit 150*c* outputs the generated identification information to the display control unit 150*b*. The identifying unit 150*c* repeats the above processing each time information about a reproduction time is received.

Figure 18:
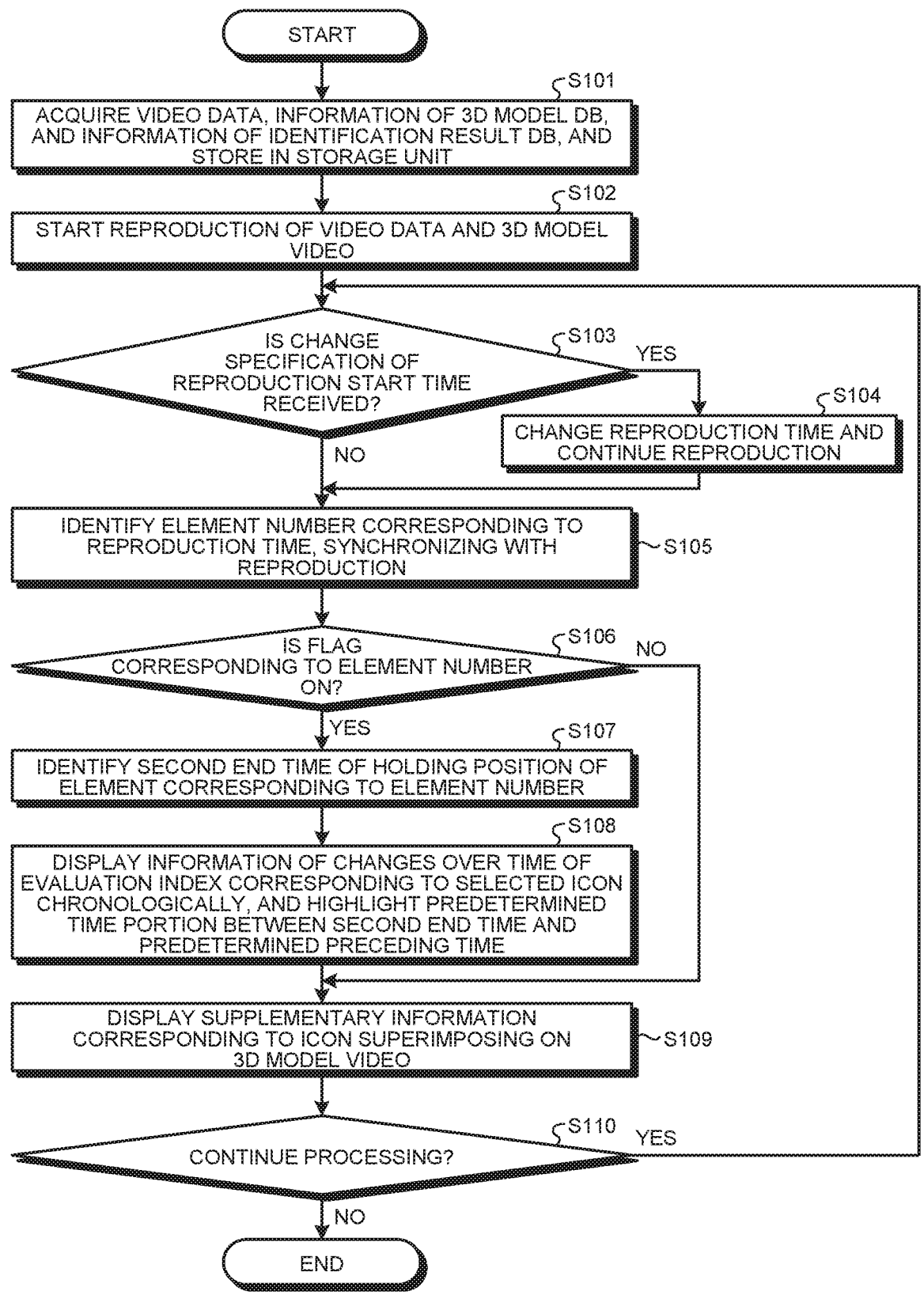
FIG. 18 is a flowchart illustrating a procedure of processing performed by the information processing device according to the present embodiment.

Next, an example of a procedure of processing performed by the information processing device 100 according to the present embodiment is described. FIG. 18 is a flowchart illustrating a procedure of processing performed by the information processing device according to the present embodiment. As illustrated in FIG. 18, the acquiring unit 150*a* of the information processing device 100 acquires video data, information of the 3D model DB 82*d*, and information of the element-identification result DB 82*f*, to store in the storage unit 140 (step S101).

The display control unit 150*b* of the information processing device 100 starts reproduction of the video data and the 3D model video (step S102). The display control unit 150*b* determines whether a change instruction of a reproduction start time is received (step S103). When the change instruction of the reproduction start time is not received (step S103: NO), the display control unit 150*b* shifts to step S105.

On the other hand, when the change instruction of the reproduction time is received (step S103: YES), the display control unit 150*b* changes the reproduction time and continues reproduction (step S104), and shifts to step S105.

The identifying unit 150*c* of the information processing device 100 identifies an element number corresponding to the reproduction time, synchronizing with reproduction (step S105). When the flag associated with the element number is not ON in the element-identification result DB 92*f* (step S106: NO), the identifying unit 150*c* shifts to step S109.

The identifying unit 150*c* identifies the second end time (and the second start time) of a holding position of the element corresponding to the element number (step S107). The display control unit 150*b* displays information of changes of the evaluation index over time corresponding to the selected icon, and chronologically displays it (in graph), and highlights a predetermined time portion between the second end time and a predetermined preceding time (step S108).

The display control unit 150*b* displays supplementary information corresponding to the icon, superimposing on the 3D model video (step S109). When the processing is to be continued (step S110: YES), the display control unit 150*b* shifts to step S103. On the other hand, when the processing is not to be continued (step S110: NO), the display control unit 150*b* ends the processing.

Next, an effect of the information processing device 100 according to the present embodiment is described. The information processing device 100 identifies a time corresponding to a pause of elements or positions that corresponds to a reproduction time. The information processing device 100 highlights a predetermined time portion from a time to be a pause of elements or positions when information relating to changes over time is chronologically displayed for an evaluation index corresponding to a selection selected from among multiple selections relating to evaluation indexes. Thus, it becomes possible to support evaluation of an element of the athlete 5.

For example, as described in FIG. 14, the information processing device 100 highlights the predetermined time portion 25*a* between the second start holding time of the holding position included in the element and a predetermined preceding time (for example, 2 second before). Unlike the reference technique described in FIG. 4, the information processing device 100 highlights the predetermined time portion 25*a* between the second end time and a predetermined preceding time as long as a holding position is included in an element of the athlete 5 at a time when a judge presses the stop button. Therefore, the judge can determine whether the requirement of the holding position is satisfied appropriately. Moreover, compared with the display method of a graph in the reference technique, an erroneous judgment by a judge can be well suppressed and, therefore, the accuracy in determining a score is improved.

When highlighting the predetermined time portion 25*a* between the second holding time and a predetermined preceding time, the information processing device 100 identifies a maximum value and a minimum value of a value relating to an evaluation index in the predetermined time portion 25*a* and displays markers. Thus, a judge can determine whether the athlete 5 is holding a position easily by comparing the maximum value and the minimum value.

The information processing device 100 determines whether an element corresponding to the reproduction time includes a holding position, synchronizing with the reproduction time of the video or the 3D model video. When the element corresponding to the reproduction time includes a holding position, the information processing device 100 performs the processing of highlighting the predetermined time portion 25*a* between eh second holding time and a predetermined preceding time. Therefore, it is possible to reduce a processing load of the information processing device 100.

The processing of the information processing device 100 described above is one example, and the information processing device 100 may perform another processing. For example, the display control unit 150*b* of the information processing device 100 may highlight a predetermined time portion between the second start time and a predetermined preceding time as long as an element of the athlete 5 includes a holding position at a time when a judge presses the stop button.

Figure 19:
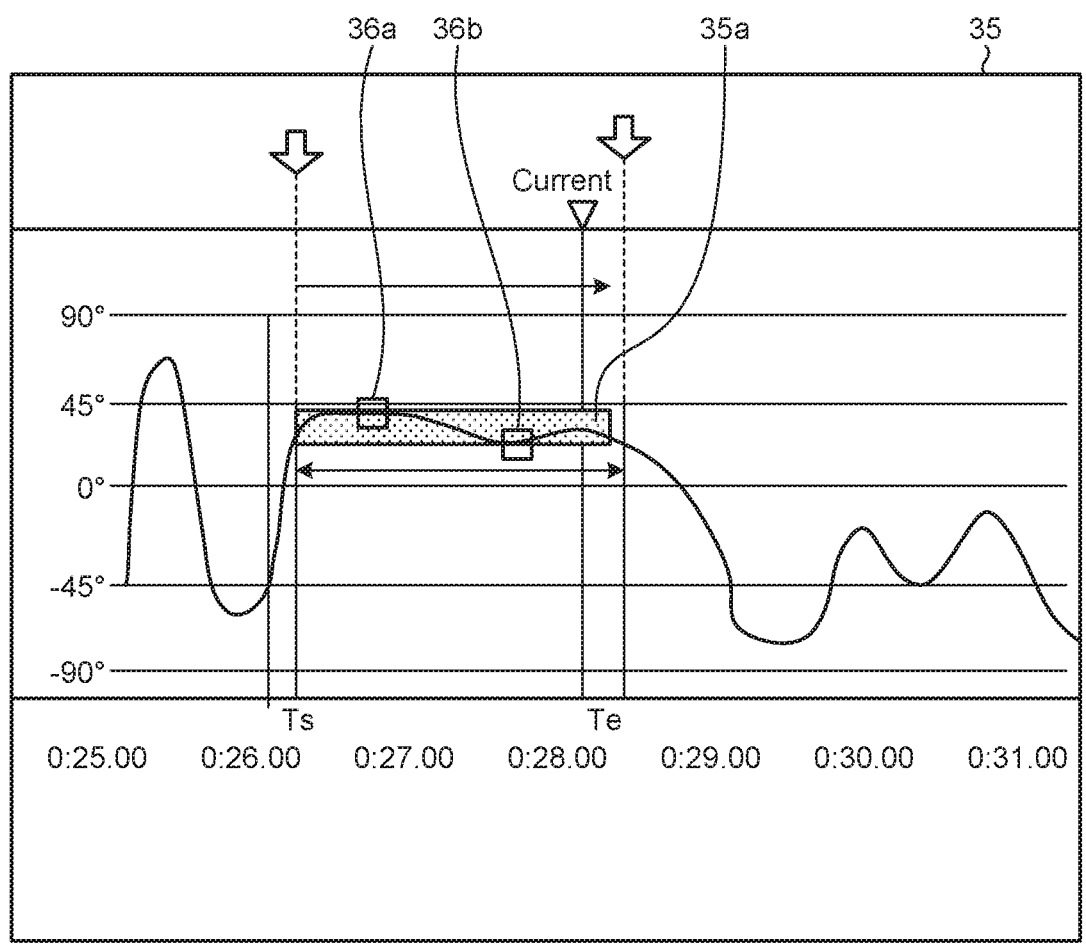
FIG. 19 is a diagram for describing another processing performed by the information processing device.

FIG. 19 is a diagram for describing another processing performed by the information processing device. A vertical axis in graph 35 is for a value relating to an evaluation index, and corresponds to, for example, a shoulder angle. A horizontal axis in the graph 35 is an axis corresponding to time. For example, a timing (a time) when a judge presses the stop button, or a time of reproduction is "current". The display control unit 150*b* identifies the second start time "Ts" of a holding position included in an identified element, and highlights a predetermined time portion 35*a* between the second start time and a predetermined preceding time (for example, 2 seconds before). Moreover, the information processing device 100 displays a marker 36*a* that indicates a maximum value of the shoulder angle and a marker 36*b* that indicates a minimum value thereof in the predetermined time portion 35*a*.

At a time when the judge presses the stop button, only if an element of the athlete 5 includes a holding position, the predetermined time portion 35*a* between the second start time and a predetermined preceding time is highlighted. Therefore, the judge can determine whether the requirement of the holding position is satisfied appropriately.

Figure 20:
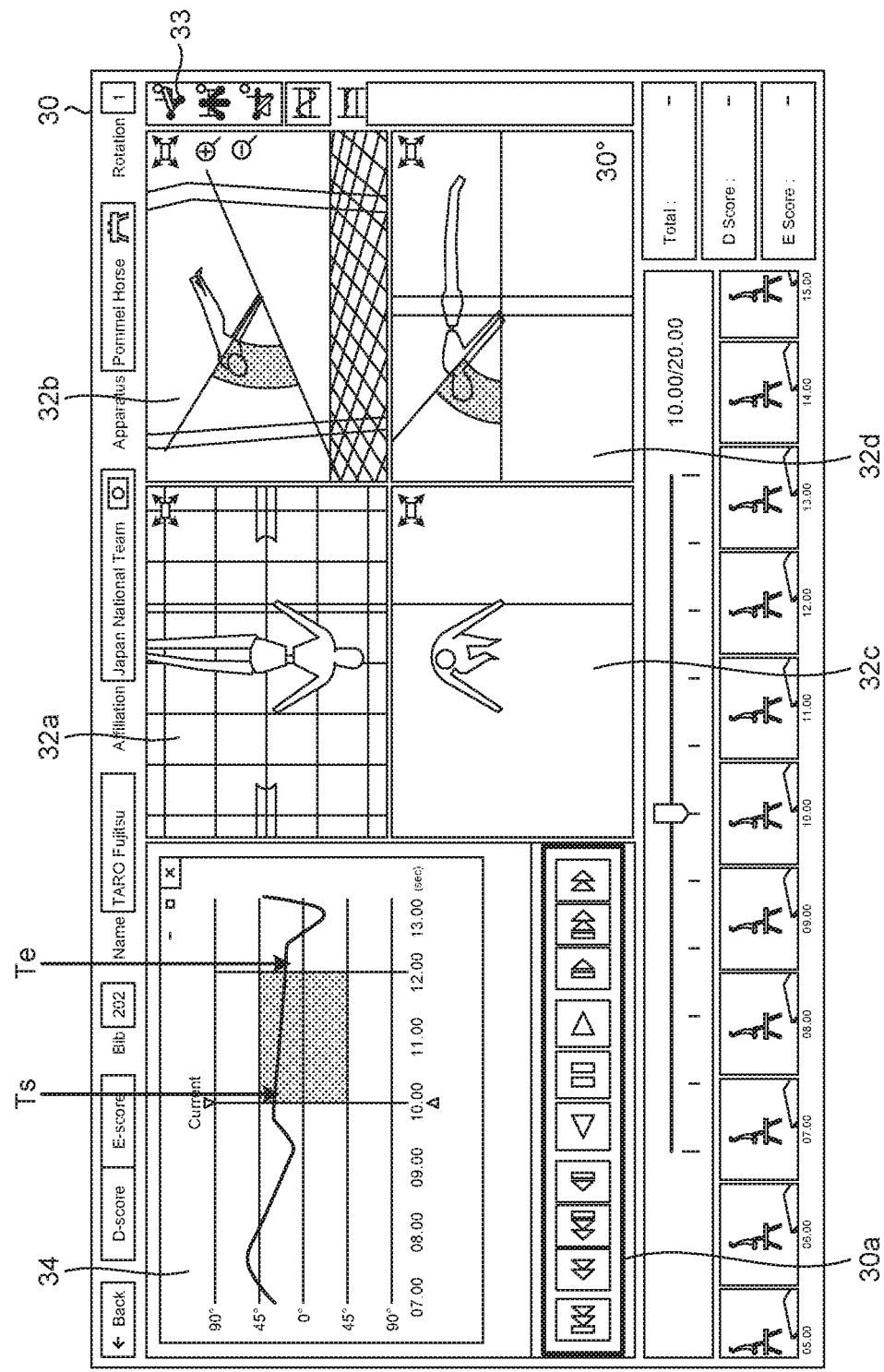
FIG. 20 is a diagram illustrating an example of another display screen displayed by the information processing device.

FIG. 20 is a diagram illustrating an example of another display screen displayed by the information processing device. As illustrated in FIG. 20, this display screen includes regions 30*a*, 31, 32*a* to 32*d*, and 33.

The region 30*a* is a region that includes buttons to control reproduction, stop, frame advance, fast-forward, rewind, and the like of a video or a 3D model video. The judge presses respective buttons in the region 30*a* to control reproduction, stop, frame advance, fast-forward, rewind, and the like.

The regions 32*a* to 32*d* are regions in which a 3D model video is respectively displayed from a virtual eyepoint that is specified in advance. The 3D model video displayed in the regions 32*a* to 32*d* is reproduced, stopped, frame-advanced, fast-forwarded, rewound, and the like according to a button pressed in the region 30*a*.

The region 33 is a region in which icons of evaluation index related to respective elements are displayed. The judge selects either icon from among the icons displayed in the region 33.

The region 34 is a region in which a graph that indicates information relating to changes over time chronologically is displayed, for the evaluation index of the selected icon. The judge refers to a graph in the region 34, and thereby determines whether the holding position performed by the athlete satisfies requirements. For example, when a holding position is included in an element that is being performed by the athlete 5 at the production time, the information processing device 100 may highlight a region between the start time Ts and the end time Te of the holding position.

The case in which the element identification device 80 and the information processing device 100 are implemented in separate devices has been explained in the system illustrated in FIG. 5, but it is not limited thereto. The information processing device 100 may include a function of the element identification device 80. For example, the information processing device 100 may have a function of the control unit 83 of the element identification device 80, and may generates the 3D model DB 82d and the element-identification result DB 82f based on the information stored in the storage unit 82.

Figure 21:
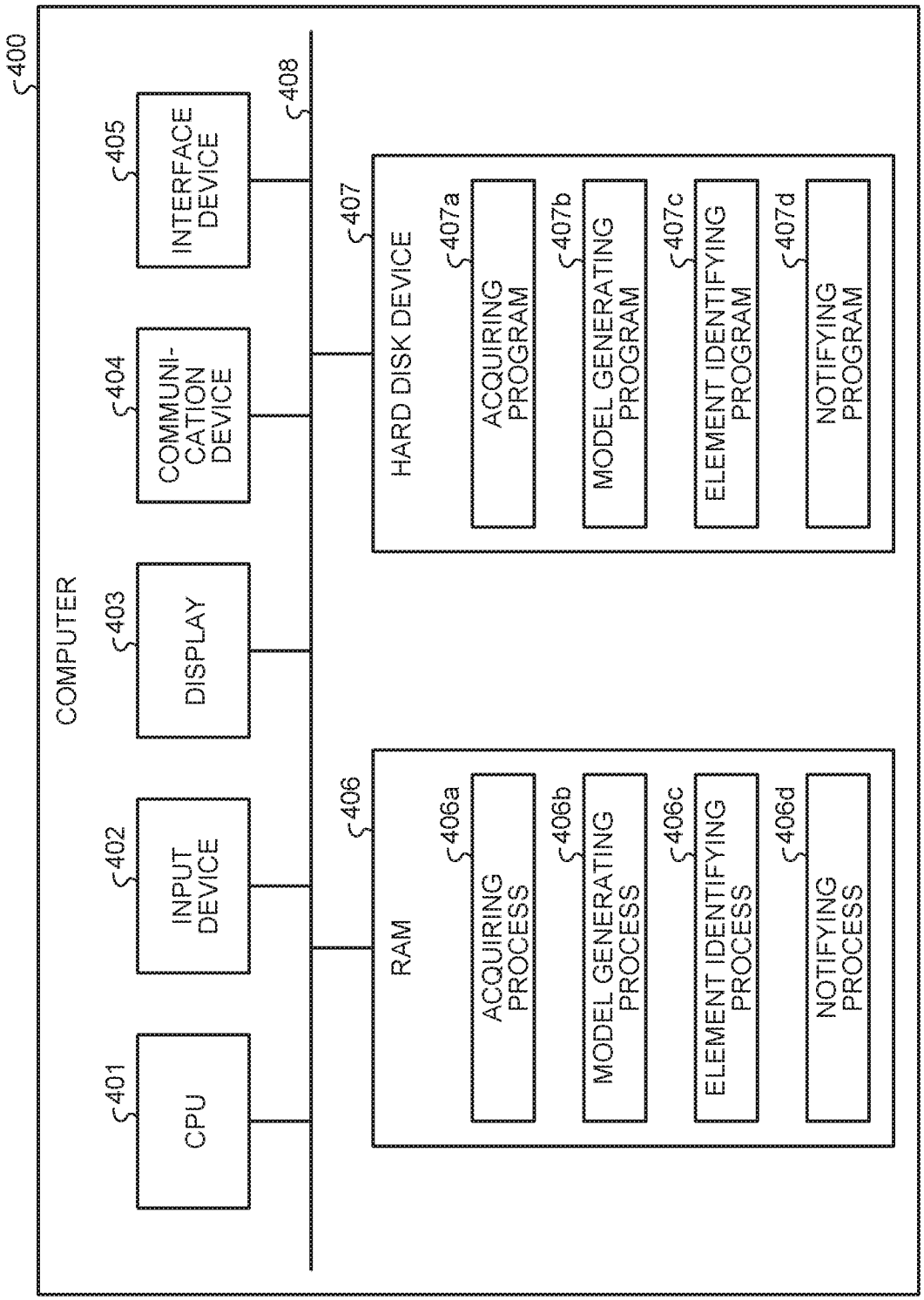
FIG. 21 is a diagram illustrating an example of a hardware configuration of a computer that implements functions similar to those of the information processing device according to the present embodiment.

Next, an example of a hardware configuration of a computer that implements similar functions as the element identification device 80 and the information processing device 100 is described. FIG. 21 is a diagram illustrating an example of a hardware configuration of a computer that implements functions similar to those of the element identification device according to the present embodiment.

As illustrated in FIG. 21, a computer 400 includes a CPU 401 that performs various kinds of arithmetic processing, an input device 402 that receives an input of data from a user, and a display 403. Moreover, the computer 400 includes a reader device 404 that reads a program and the like from a storage medium, and an interface device 405 that communicates data with the 3D laser sensor 50 and the like through a wired or wireless network. The computer 400 includes a RAM 406 that temporarily stores various kinds of information, and a hard disk device 407. The respective devices 401 to 407 are connected to a bus 408.

The hard disk device 407 includes an acquiring program 407a, a model generating program 407b, an element identifying program 407c, a notifying program 407d. The CPU 401 reads the acquiring program 407a, the model generating program 407b, the element identifying program 407c, and the notifying program 407d and develops them in the RAM 406.

The acquiring program 407a functions as an acquiring process 406a. The model generating program 407b functions as a model generating process 406b. The element identifying program 407c functions as an element identifying process 406c. The notifying program 407d functions as a notifying process 406d.

Processing of the acquiring process 406a corresponds to the processing of the acquiring unit 83a. Processing of the model generating process 406b corresponds to the processing of the model generating unit 83b. Processing of the element identifying process 406c corresponds to the processing of the element identifying unit 83c. Processing of the notifying process 406d corresponds to the processing of the notifying unit 83d.

The respective programs 407a to 407d are not necessarily requested to be stored in the hard disk device 407 from the beginning. For example, the respective programs are stored in a "portable physical medium" to be inserted in the computer 400, such as a flexible disk (FD), a CD-ROM, a digital versatile disk (DVD), a magneto-optical disk, and an IC card. The respective programs 407a to 407d may be read therefrom and executed by the computer 400.

Figure 22:
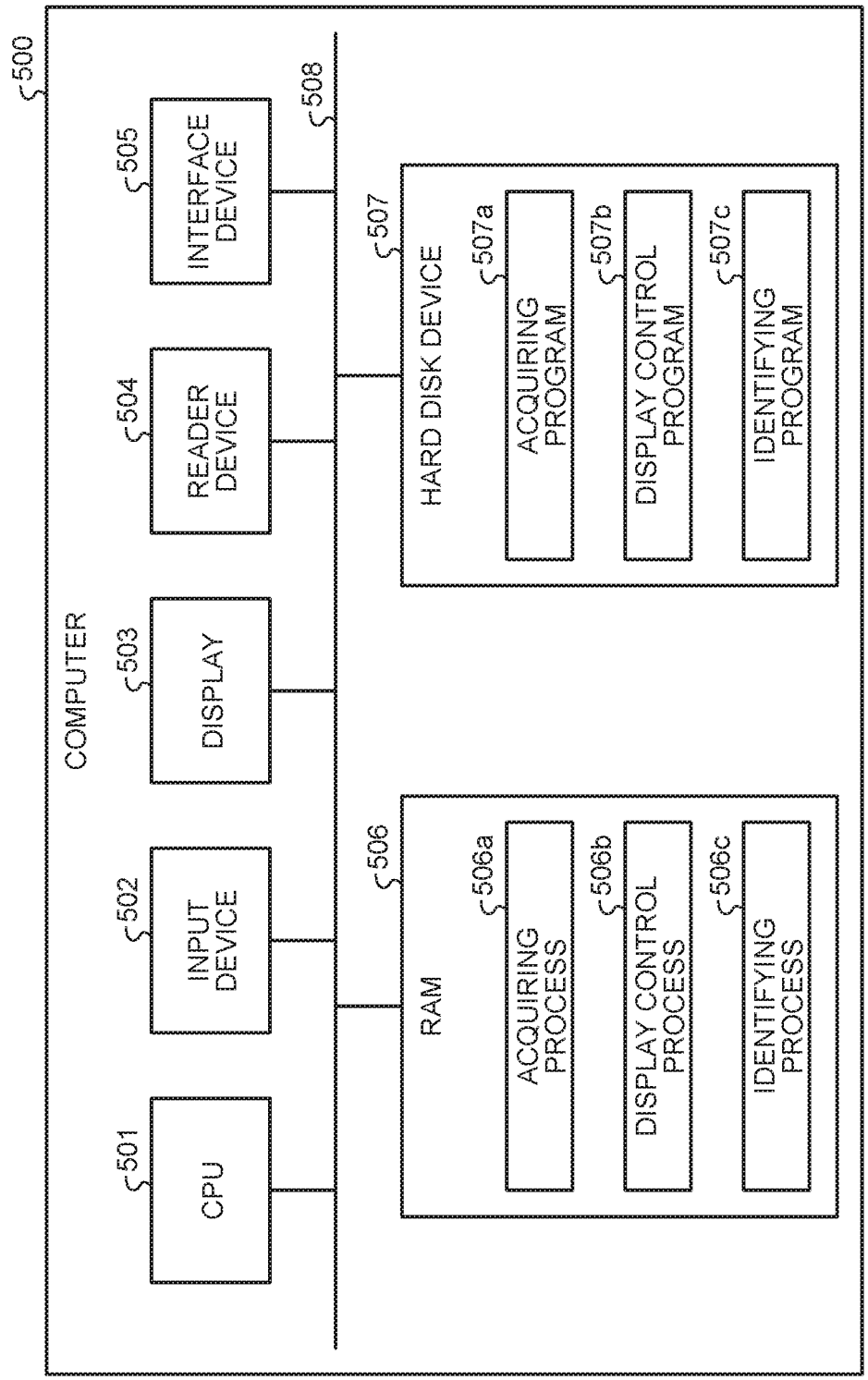
FIG. 22 is a diagram illustrating an example of a hardware configuration of a computer that implements functions similar to those of the information processing device according to the present embodiment.

FIG. 22 is a diagram illustrating an example of a hardware configuration of a computer that implements functions similar to those of the information processing device according to the present embodiment.

As illustrated in FIG. 22, a computer 500 includes a CPU 501 that performs various kinds of arithmetic processing, an input device 502 that receives an input of data from a user, and a display 503. Moreover, the computer 500 includes a reader device 504 that reads a program and the like from a storage medium, and an interface device 505 that communicates data with the camera 55, the element identification device 80, and the like through a wired or wireless network. The computer 500 includes a RAM 506 that temporarily stores various kinds of information, and a hard disk device 507. The respective devices 501 to 507 are connected to a bus 508.

The hard disk device 507 includes an acquiring program 507a, a display control program 507b, and an identifying program 507c. The CPU 501 reads the acquiring program 507a, the display control program 507b, and the identifying program 507c and develops them in the RAM 506.

The acquiring program 507a functions as an acquiring process 506a. The display control program 507b functions as a display control process 506b. The identifying program 507c functions as an identifying process 506c.

Processing of the acquiring process 506a corresponds to the processing of the acquiring unit 150a. Processing of the display control process 506b corresponds to the processing of the display control unit 150b. Processing of the identifying process 506c corresponds to the processing of the identifying unit 150c.

The respective programs 507a to 507c are not necessarily requested to be stored in the hard disk device 507 from the beginning. For example, the respective programs are stored in a "portable physical medium" to be inserted in the computer 500, such as an FD, a CD-ROM, a DVD, a magneto-optical disk, and an IC card. The respective programs 507a to 507c may be read therefrom and executed by the computer 500.

It is possible to support evaluation of an element that is subject to be scored by a judge, and that includes a holding position.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A display method executed by a processor, the display method comprising:
storing in a storage unit a 3D model video and an identification result relating to any one of a plurality of elements included in a series of exercise and a position of an athlete that performs the elements, wherein the identification result is acquired based on 3D sensing data that is acquired by sensing the series of exercise by the athlete of a sport scored by a judge and an element dictionary data in which characteristics of an element and a position of the sport scored by a judge are defined and the 3D model video is generated based on the 3D sensing data corresponding to the series of exercise;
displaying the 3D model video on a region of a display unit;
first identifying any one of an element and a position that is being displayed in the 3D model video, based on the identification result stored in the storage unit;
second identifying, for the any one of the element and the position identified, time information corresponding to a boundary with any one of a next element and a next position, based on the identification result stored in the storage unit; and
highlighting, when information relating to changes over time is displayed on another region of the display unit for an evaluation index corresponding to a selection selected from among a plurality of selections relating to a plurality of evaluation indexes, a time portion that is superimposed on the information and extends from time corresponding to the time information, a time length of the time portion being predetermined, wherein the information is also superimposed by information indicating a range determined as a nonmoving state.

2. The display method according to claim 1, wherein the highlighting includes highlighting any one of the information relating to changes over time of the evaluation index corresponding to the selected selection, included in the time portion between a time corresponding to the time information and a predetermined preceding time, and the information relating to changes over time of the evaluation index corresponding to the selected selection, included in a time portion between the time corresponding to the time information and a predetermined succeeding time.

3. The display method according to claim 1, wherein the information relating to changes over time of the evaluation index is information that indicates changes over time in any one of a distance between joints and a joint angle, based on a skeleton identification result including positional information of a plurality of joints of the athlete identified from the 3D sensing data.

4. The display method according to claim 3, wherein the highlighting includes further displaying a maximum value and a minimum value of any one of the distance between joints and the joint angle included in the time portion.

5. The display method according to claim 1, wherein
the second identifying includes accepting a selection of any one of reproduction time and a reproduction stop time, and determining whether a holding position is included in any one of the element and the position being displayed as a result of the selection of any one of the reproduction time and the reproduction stop time based on the reproduction time or the reproduction stop time, and the identification result, and
the highlighting includes highlighting the time portion from the time corresponding to the time information when any one of the element and the position being displayed includes a holding position.

6. A non-transitory computer-readable recording medium storing therein a display program that causes a computer to execute a process, the process comprising:
storing in a storage unit a 3D model video and an identification result relating to any one of a plurality of elements included in a series of exercise and a position of an athlete that performs the elements, wherein the identification result is acquired based on 3D sensing data that is acquired by sensing the series of exercise by the athlete of a sport scored by a judge and an element dictionary data in which characteristics of an element and a position of the sport scored by a judge are defined
3D model video is generated based on the 3D sensing data corresponding to the series of exercise, based on the identification result;
displaying the 3D model video on a region of a display unit;
first identifying any one of an element and a position that is being displayed in the 3D model video, based on the identification result stored in the storage unit;
second identifying, for the any one of the element and the position, time information corresponding to a boundary with any one of a next element and a next position, based on the identification result stored in the storage unit; and highlighting, when information relating to changes over time is displayed on another region of the display unit for an evaluation index corresponding to a selection selected from among a plurality of selections relating to a plurality of evaluation indexes, a time portion that is superimposed on the information and extends from time corresponding to the time information, a time length of the time portion being predetermined, wherein the information is also superimposed by information indicating a range determined as a nonmoving state.

7. The non-transitory computer-readable recording medium according to claim 6, wherein the highlighting includes highlighting any one of the information relating to changes over time of the evaluation index corresponding to the selected selection, included in the time portion between a time corresponding to the time information and a predetermined preceding time, and the information relating to changes over time of the evaluation index corresponding to the selected selection, included in the time portion between a time corresponding to the time information and a predetermined succeeding time.

8. The non-transitory computer-readable recording medium according to claim 6, wherein the information relating to changes over time of the evaluation index is information that indicates changes over time in any one of a distance between joints and a joint angle, based on a skeleton identification result including positional information of a plurality of joints of the athlete identified from the 3D sensing data.

9. The non-transitory computer-readable recording medium according to claim 8, wherein the highlighting includes further displaying a maximum value and a minimum value of any one of the distance between joints and the joint angle included in the time portion.

10. The non-transitory computer-readable recording medium according to claim 6, wherein
the second identifying includes accepting a selection of any one of reproduction time and a reproduction stop time, and determining whether a holding position is included in any one of the element and the position being displayed as a result of the selection of any one of the reproduction time and the reproduction stop time based on the reproduction time or the reproduction stop time, and the identification result, and
the highlighting includes highlighting the time portion from the time corresponding to the time information when any one of the element and the position being displayed includes the holding position.

11. An information processing device comprising:
a memory; and
a processor coupled to the memory and configured to:
store in a storage unit a 3D model video and acquire an identification result relating to any one of a plurality of elements included in a series of exercise and a position of an athlete that performs the elements, wherein the identification result is acquired based on 3D sensing data that is acquired by sensing the series of exercise by the athlete of a sport scored by a judge and an element dictionary data in which characteristics of an element and a position of the sport scored by a judge are defined
and the 3D model video is generated based on the 3D sensing data corresponding to the series of exercise,
display the 3D model video on a region of a display unit, first identify any one of an element and a position that is being displayed in the 3D model video based on the identification result stored in the storage unit, second identify, for the any one of the element and the position identified, time information corresponding to a boundary with any one of a next element and a next position, based on the identification result stored in the storage unit, and highlight, when information relating to changes over time is displayed on another region of the display unit for an evaluation index corresponding to a selection selected from among a plurality of selections relating to a plurality of evaluation indexes, a time portion that is superimposed on the information and extends from time corresponding to the time information, a time length of the time portion being predetermined, wherein the information is also superimposed by information indicating a range determined as a nonmoving state.

12. The information processing device according to claim 11, wherein the processor is further configured to highlight any one of the information relating to changes over time of the evaluation index corresponding to the selected selection, included in the time portion between a time corresponding to the time information and a predetermined preceding time, and the information relating to the changes over time of the evaluation index corresponding to the selected selection, included in the time portion between a time corresponding to the time information and a predetermined succeeding time.

13. The information processing device according to claim 11, wherein the information relating to changes over time of the evaluation index is information that indicates changes over time in any one of a distance between joints and a joint angle, based on a skeleton identification result including positional information of a plurality of joints of the athlete identified from the 3D sensing data.

14. The information processing device according to claim 13, wherein the processor is further configured to display a maximum value and a minimum value of any one of the distance between joints and the joint angle included in the time portion.

15. The information processing device according to claim 11, wherein the processor is further configured to:
accept a selection of any one of reproduction time and a reproduction stop time, and determine whether a holding position is included in any one of the element and the position being displayed as a result of the selection of any one of the reproduction time and the reproduction stop time based on the reproduction time, the reproduction stop time, and the identification result, and highlight the time portion from the time corresponding to the time information when any one of the element and the position being displayed includes the holding position.

* * * * *